United States Patent
Shiota et al.

(10) Patent No.: US 6,781,659 B2
(45) Date of Patent: Aug. 24, 2004

(54) LIQUID CRYSTAL DISPLAY DEVICE, PIXELS REPAIR METHOD THEREOF, AND DRIVE METHOD THEREOF

(75) Inventors: Akinori Shiota, Hirakata (JP); Hiroyuki Yamakita, Osaka (JP); Katsuhiko Kumagawa, Neyagawa (JP); Sadayoshi Hotta, Hirakata (JP); Yoneharu Takubo, Kanazawa (JP)

(73) Assignee: Matsushita Electric Industrial Co., Ltd. (JP)

(*) Notice: Subject to any disclaimer, the term of this patent is extended or adjusted under 35 U.S.C. 154(b) by 213 days.

(21) Appl. No.: 09/958,677
(22) PCT Filed: Feb. 15, 2001
(86) PCT No.: PCT/JP01/01104
§ 371 (c)(1),
(2), (4) Date: Oct. 12, 2001
(87) PCT Pub. No.: WO01/61405
PCT Pub. Date: Aug. 23, 2001

(65) Prior Publication Data
US 2002/0154079 A1 Oct. 24, 2002

(30) Foreign Application Priority Data
Feb. 15, 2000 (JP) ......................................... 2000-036122

(51) Int. Cl.[7] ............................................. G02F 1/1345
(52) U.S. Cl. ............................. 349/139; 349/38; 349/42
(58) Field of Search ............................... 349/33, 38–39, 349/42, 54–55, 139, 141, 142, 143, 144, 145, 146, 147

(56) References Cited

U.S. PATENT DOCUMENTS

| 5,151,806 | A | * | 9/1992 | Kawamoto et al. ........... 349/39 |
| 5,946,067 | A | * | 8/1999 | Kim et al. .................. 349/141 |
| 6,300,926 | B1 | * | 10/2001 | Yoneya et al. ............... 345/87 |
| 6,515,720 | B1 | * | 2/2003 | Iizuka et al. ................. 349/39 |

FOREIGN PATENT DOCUMENTS

| JP | 3-242625 | 10/1991 |
| JP | 9-318961 | 12/1997 |
| JP | 10-10556 | 1/1998 |
| JP | 11-125840 | 5/1999 |
| JP | 11-295764 | 10/1999 |

* cited by examiner

Primary Examiner—Chandra Chaudharl
Assistant Examiner—Thanhha Pham
(74) Attorney, Agent, or Firm—Parkhurst & Wendel, L.L.P.

(57) ABSTRACT

A liquid crystal display device, wherein liquid crystal is driven by an electric field that is parallel to a substrate, includes a plurality of gate lines $(X_{m-1})$, $(X_m)$ and a plurality of data lines $(Y_{n-1})$, $(Y_n)$ provided such that the data lines intersect with the plurality of gate lines, switching elements (13) connected to the gates lines $(X_{m-1})$ and the data lines $(Y_{n-1})$, pixel electrodes (11) connected to the data lines $(Y_{n-1})$ via the switching elements (13), and opposing electrodes (12) forming pairs with the pixel electrodes (11), wherein a plurality of storage capacities (14a), (14b) for maintaining a charge of the pixel electrodes (11) are provided in a distributed arrangement associated with points where the plurality of gate lines $(X_{m-1})$, $(X_m)$ and the plurality of data lines $(Y_{n-1})$, $(Y_n)$ intersect.

7 Claims, 22 Drawing Sheets

(a)

(b)

(a)

(b)

(a)

(b)

(c)

(a)

(b)

(a)

(b)

LIQUID CRYSTAL DISPLAY DEVICE, PIXELS REPAIR METHOD THEREOF, AND DRIVE METHOD THEREOF

TECHNICAL FIELD

The present invention relates to an active-matrix liquid crystal display device, a repair method thereof and drive method thereof, and in particular relates to an active-matrix liquid crystal display device of the transverse electric field type, a repair method thereof, and a drive method thereof.

BACKGROUND ART

Recently, together with advancements in personal computers, the trend has been for an increase in the demand for liquid crystal display devices, particularly for active-matrix liquid crystal display devices. Moreover, this trend is not limited to personal computers, and the demand for liquid crystal television (hereafter abbreviated as liquid crystal TV) is also on the rise.

One of the properties demanded of liquid crystal TVs is a broad viewing angle. A variety of different types of liquid crystal display devices have been developed in order to achieve a broad viewing angle. Among those, particular interest has been given to active-matrix liquid crystal display devices of the transverse electric field type (IPS (In-Plane Switching) mode).

Generally, in active-matrix liquid crystal display devices, a liquid crystal is injected between two glass substrates, with one of the glass substrates being provided with a plurality of signal line (data line) groups and a plurality of scanning line (gate line) groups that intersect to form a matrix. Furthermore, thin film transistors (TFTs) are disposed at each portion where the signal lines and scanning lines intersect.

In the case of active-matrix liquid crystal display devices of the transverse electric field type, pixel electrodes for controlling the arrangement of the liquid crystal at each pixel, and opposing electrodes forming a pair with the pixel electrodes, are further provided on the same substrate.

When displaying an image, the scanning lines are scanned, and the thin film transistors at the intersecting portions are turned on. When a thin film transistor is turned on, the signal potential inputted in the signed line is written onto the pixel electrode. When this happens, an electric potential difference is applied between the pixel electrode and the opposing electrode, and an electric field (transverse electric field) parallel to the substrate surface is created, and thus the liquid crystal changes from an initial alignment to a new alignment. Therefore, the amount of light that passes through the liquid crystal layer can be adjusted. That is, the polarization of light passing through the liquid crystal changes according to the applied signal voltage, and depending on that polarization, a light or dark pixel is displayed on the display screen.

In active-matrix liquid crystal display devices of the transverse electric field type, the liquid crystal molecules are always in a state parallel to the substrate, so that compared to conventional liquid crystal display panels, in which the pixel electrodes and the opposing electrodes are disposed perpendicular to the panel, the contrast does not easily change even if the panel is viewed from an oblique angle, and thus viewing angle properties can be considerably improved.

Conventional active-matrix liquid crystal display devices of the transverse electric field type are described in further detail below. FIG. 21(a) is a plan view illustrating the arrangement of the electrodes, wiring, and the like in a single pixel in a liquid crystal display panel provided in a conventional active-matrix liquid crystal display device of the transverse electric field type, and FIG. 21(b) is a cross-sectional view of that liquid crystal display device. Also, FIG. 22(a) is a plan view illustrating the arrangement of the electrodes, wiring and the like in a single pixel in a liquid crystal display panel provided in another conventional active-matrix liquid crystal display device of the transverse electric field type, and FIG. 22(b) is a cross-sectional view of that liquid crystal display device.

As shown in FIGS. 21(a) and (b), the liquid crystal display panel has an array substrate 1001 and an opposing substrate 1002 both made of the glass substrates and disposed in opposition to one another, and a liquid crystal layer 1003 provided between the two. Formed on the surface of the array substrate 1001 is a plurality of scanning lines 1004 having a fixed spacing between one another, a plurality of signal lines 1005 that intersect with the scanning lines 1004, pixel electrodes 1006 provided at each pixel, opposing electrodes 1007 forming a pair with the pixel electrodes 1006, and TFTs 1008 that function as switching elements between the pixel electrodes 1006 and the signal wires 1006. Furthermore, the opposing electrodes 1007 are disposed parallel to the scanning lines 1004. Also, a transparent insulating layer 1009 is formed on the array substrate 1001 such that it covers the scanning lines 1004 and the opposing electrodes 1007. The pixel electrodes 1006 are made of a plurality of pixel electrode portions 1006a and linking portions 1006b for linking the plurality of pixel electrode portions 1006a. The linking portions 1006b are provided on the scanning lines 1004. Additionally, the opposing electrodes 1007 are made up of a plurality of opposing electrode portions 1007a and an opposing electrode wire 1007b for linking the plurality of opposing electrode portions 1007a. Furthermore, storage capacity portions 1015 are provided on the portions where the scanning lines 1004 and the linking portions 1006b overlap.

More specifically, the TFTs 1008 are provided on the array substrate 1001 and include a gate electrode 1010, a silicon layer 1011, which is selectively provided on the insulating layer 1009, a source electrode 1012, and a drain electrode 1013.

The source electrodes 1012 are connected to the signal wires 1005, and the drain electrodes 1013 are connected to the pixel electrodes 1006. The pixel electrode portions 1006a and the opposing electrode portions 1007a are arranged in alternation. Thus, an electric field substantially parallel to the array substrate 1001 is generated between the pixel electrode portions 1006a and the opposing electrode portions 1007a, and the alignment of the liquid crystal molecules is controlled at each pixel.

Also, an alignment film 1014 for aligning the liquid crystal is formed on the array substrate 1001 so that it covers the scanning lines 1004, the signal lines 1005, the pixel electrodes 1006, the opposing electrodes 1007, and the TFTs 1008.

On the other hand, the opposing substrate 1002 is made of a glass substrate, the inner surface side of which is provided with a color filter (not shown in the drawings). Furthermore, an alignment film 1014 is also formed so as to cover this color filter. The alignment films 1014 and 1014 are made of polyimide, the surface of which has been processed by rubbing. The rubbing process is performed by rubbing a surface with a roller coated with a fabric such as rayon.

Additionally, polarizers (not shown in the drawings) are provided on the outer sides of the array substrate 1001 and the opposing substrate 1002. The two polarizers are disposed such that their respective polarizing axes are in cross nicol arrangement. Note that in the scenario described above, the linking portions 1006b are provided above the scanning lines 1004 in the pixel electrodes 1006, but as shown in FIG. 22, it is also possible to provide the linking portions 1006b above the opposing electrode wiring 1007b in the opposing electrodes 1007. In that configuration, storage capacity portions 1016 are provided between the linking portions 1006b and the opposing electrode wire 1007b.

As described earlier, in conventional IPS mode liquid crystal display devices, the insulating layer 1009, which is made of silicon nitride, is provided between the layer of pixel electrodes 1006 and the layer of the opposing electrodes 1007, so that both layers are insulated from each other by the insulating layer 1009. However, because the insulating layer 1009 is thin, portions where the pixel electrodes 1006 and the opposing electrodes 1007 three-dimensionally intersect, for example at a defective location 1017 shown in FIG. 21(a), may become conductive when foreign substances, for example, have mixed into the insulating layer 1009. Also, portions where the linking portions 1006b and the scanning lines 1004 overlap (storage capacity portions 1015), for example at a defective location 1018 shown in FIG. 21(a) and a defective location 1019 shown in FIG. 23(a), may become conductive for the same reason.

Moreover, when viewed horizontally, the pixel electrodes 1006 and the opposing electrodes 1007 are normally designed such that they are formed at a spacing of several microns to several dozen microns. Consequently, when patterning is performed with a photolithography step, electrical short-circuits occur easily between the pixel electrodes 1006 and the opposing electrodes 1007 (defective location 1020 shown in FIG. 21(a) and defective location 1021 shown in FIG. 22(a)), or between the pixel electrodes 1006 and the scanning lines 1004, when there are pattern defects between the two electrodes.

When current is conducted, or when short-circuits occur, between the pixel electrodes 1006 and the opposing electrodes 1007 in this way, the electric potential between both electrodes drops, thereby causing the problem that all of the pixels turn dark or white and become display defective pixels (hereafter abbreviated simply as "bad pixels").

The existence of these bad pixels is a problem in particular in liquid crystal TVs. In the case of displays for personal computers, the level of the resolution is that of XGA (Extended Graphics Array) or SXGA (Super Extended Graphics Array). On the other hand, liquid crystal TVs have a resolution level of NTSC (National TV Standards Committee), and have a lower resolution than displays for personal computers. Consequently, the pixel size in liquid crystal TVs is larger than that of displays for personal computers. Therefore, pixel defects in liquid crystal TVs are more easily visible than pixel defects in displays for personal computers. For this reason, bad pixels must be recovered to improve yield when manufacturing display devices.

As explained above, the occurrence of bad pixels resulting from the conduction of current or short-circuits caused by impurities between the pixel electrodes 1006 and the opposing electrodes 1007 is normally repaired by cutting off the pixel electrodes from the TFTs by the irradiation of laser light. For example, irradiating laser light on a repair location 1022 with respect to the defective location 1018 cuts away the pixel electrode 1006 and the defective location 1018, and the recovery of bad pixels is achieved. However, there was the problem that pixels did not operate after being repaired, and the entire pixel went completely black when on. There was also the problem, for example, that even if repaired pixels could be operated, if the storage capacity portion 1015 had been cut off, the conduction in the storage capacity portion 1015 caused charge leaks from the liquid crystal capacity that resulted in the dropping of the brightness of that pixel, and in display nonuniformities, for example.

Also, as is disclosed in the Japanese Unexamined Patent Publication 05-333376, a method has been proposed for providing two TFTs on a single pixel in advance, so that even if one of the TFTs and pixel electrodes is cut off and becomes inactive after laser light has been irradiated, pixel activation is ensured by the other TFT, and the pixel can be prevented from becoming defective. With this repair method, however, in a normal case wherein pixel defects do not occur, there was the problem that because an unnecessary TFT existed in each pixel, the numerical aperture of the pixels dropped and the transmissivity of the pixels was lowered.

DISCLOSURE OF THE INVENTION

In view of the problems of the related art, it is an object of the present invention to provide a liquid crystal display device, in which a decrease in transmissivity can be impeded and an increase of yield can be achieved by recovering bad pixels, a pixel repair method and a drive method for same.

In order to achieve this object, a liquid crystal display device in accordance with the present invention, wherein a liquid crystal layer is formed between a pair of substrates, and wherein liquid crystal in the liquid crystal layer is driven by an electric field that is parallel to the substrate surface, wherein provided on one substrate of the pair of substrates are a plurality of gate lines, a plurality of data lines provided such that the data lines intersect with the plurality of gate lines, switching elements associated with points where the plurality of gate lines and the plurality of data lines intersect, and which are connected to the gates lines and the data lines, pixel electrodes connected to the data lines via the switching elements, and opposing electrodes forming pairs with the pixel electrodes, wherein a plurality of storage capacities for maintaining a charge of the pixel electrode are provided in a distributed arrangement associated with points where the plurality of gate lines and the plurality of data lines intersect.

With this configuration, switching elements are provided for each point where the plurality of gate lines and the plurality of data lines intersect, or in other words: a switching element is provided for each pixel. Furthermore, each pixel is provided with a plurality of storage capacities in a distributed arrangement. Here, each pixel is provided with a plurality of storage capacities "in a distributed arrangement" means that if, for example, one of the plurality of storage capacities is electrically short-circuited and cannot operate normally, and then this defective storage capacity is cut off, then the other storage capacities are arranged such that they can still operate.

Consequently, with this configuration, even when a storage capacity with a defect is cut off, then the other storage capacities still function normally, so that regularly functioning storage capacities compensate for the storage capacity with the defect and fluctuations in the potential of the pixel electrode can be inhibited. Therefore, comparing pixels in which a defect storage capacity has been cut off with regular pixels, it is possible to suppress extreme discrepancies in brightness and flicker properties. Thus, bad pixels can be made more inconspicuous on the display screen, and an increase in yield can be achieved.

In the above configuration, it is possible to adopt a configuration, in which at least some of the plurality of storage capacities are arranged in series.

It is further possible to adopt a configuration, in which a bypass is provided for bypassing the storage capacity from among the plurality of storage capacities arranged in series that is closest to the switching element.

In this configuration, it is further possible to adopt a configuration, in which at least some of the plurality of storage capacities are arranged in parallel.

In this configuration, it is further possible to adopt a configuration, in which at least some of the plurality of storage capacities are arranged in a loop.

Here, "arranged in series", "arranged in parallel", and "arranged in a loop" does not mean that the electrical connections in the equivalent circuit are in parallel or in series for example, but rather the concept of how the plurality of storage capacities are arranged in one pixel. FIG. 20 is a diagram illustrating schematically how a plurality of storage capacities can be arranged. A series arrangement means that the arrangement is for example as shown in FIG. 20(a). With this arrangement, even if there is a defect in the third storage capacity counted from the switching element for example, and then this storage capacity is cut off, there are still two normally operating storage capacities left when. Consequently, brightness discrepancies to the normal pixels can be reduced and an increase in yield can be achieved. As mentioned above, providing a bypass for bypassing the storage capacity that is closest to the switching element prevents that also the other normal storage capacities are cut off simultaneously when there is a defect in that storage capacity and that storage capacity is cut off. As a result, a further increase in yield can be achieved. A parellel arrangement means that the arrangement is for example as shown in FIG. 20(b). With this arrangement, the other storage capacities can still be operated even when a storage capacity with a defect is cut off, so that a further increase in yield can be achieved. A loop arrangement means that the arrangement is for example as shown in FIG. 20(c). With this arrangement, the other storage capacities can still operate normally even when a storage capacity with a defect is cut off, so that, again, a further increase in yield can be achieved.

In order to achieve the above-stated object, a liquid crystal display device in accordance with the present invention, wherein a liquid crystal layer is formed between a pair of substrates, and wherein liquid crystal in the liquid crystal layer is driven by an electric field that is parallel to the substrate surface, wherein provided on one substrate of the pair of substrates are a plurality of gate lines, a plurality of data lines provided such that the data lines intersect with the plurality of gate lines, switching elements associated with points where the plurality of gate lines and the plurality of data lines intersect, and which are connected to the gates lines and the data lines, pixel electrodes connected to the data lines via the switching elements; and opposing electrodes forming pairs with the pixel electrodes, wherein the pixel electrodes overlap with a portion of the previous or subsequent gate line of the plurality of gate lines, and/or with a portion of the opposing electrode, at a plurality of locations via an insulating layer, and wherein at least two of the plurality of overlaps form storage capacities.

In this configuration, it is further possible to adopt a configuration wherein, even if a portion of the pixel electrode forming one storage capacity of the at least two storage capacities in the pixel electrode is cut off, a portion of the pixel electrode forming the other storage capacities is still connected to the switching element.

With this configuration, at least two of the plurality of overlaps in the pixels function as storage capacities, so that even if for example one of them does not operate normally due to an electrical short-circuit, and the storage capacity with the defect is cut off, fluctuations of the potential level of the pixel electrode can be inhibited by the other storage capacity. As a result, extreme discrepancies in brightness and flicker properties compared to the normal pixel do not occur. Thus, bad pixels can be made more inconspicuous on the display screen, and an increase in yield can be achieved.

In the above configuration, it is further possible to adopt a configuration in which the pixel electrodes include a plurality of pixel electrode portions that are provided parallel to one another and that generate the parallel electric field between the pixel electrode and the opposing electrode, and an electrode linking portion for linking the plurality of pixel electrode portions, wherein storage capacities are formed by the electrode linking portion overlapping with a portion of the previous or subsequent gate line and/or with a portion the opposing electrode.

In the above configuration, it is further possible to adopt a configuration in which the pixel electrodes include a plurality of pixel electrode portions that are provided parallel to one another, an electrode linking portion for linking the plurality of pixel electrode portions, and a storage capacity electrode for forming the storage capacities, wherein the storage capacity electrode forms a storage capacity by overlapping with a portion of the previous or subsequent gate line and/or a portion of the opposing electrode.

In the above configuration, it is further possible to adopt a configuration in which the electrode linking portion forms a storage capacity by overlapping with a portion of the previous or subsequent gate line and/or with a portion of the opposing electrode.

It is also possible that the storage capacity electrode is connected to the pixel electrode portions via a connection electrode wire. Even if a storage capacity electrode is cut off from the pixel electrode due to an electrical short-circuit between the storage capacity electrode and a portion of the previous or subsequent gate line and/or with a portion of the opposing electrode, the storage capacity electrode can be cut off easily by severing the connection electrode wire. Thus, it can be prevented that for example another pixel electrode portion is also cut off as well when the storage capacity electrode is cut off, and the maximum displayable region can be kept. As a result, bad pixels in the display screen can be made even more inconspicuous.

In addition, in this configuration, it is also possible to adopt a configuration in which the wire width of at least a portion of the connection electrode wire is smaller than the width of the pixel electrode portions. Thus, the connection electrode wire can be easily severed when the storage capacity electrode is cut off from the pixel electrode.

Moreover, in the above configuration, it is also possible to adopt a configuration in which the connection electrode wire is provided with a separation portion for separation by laser light, wherein the separation portion is further provided with a marking. Providing the connection electrode wire with a separation portion, and further providing the separation portion with a marking makes the severing of the connection electrode wire easier. As a result, a liquid crystal display device in which repair of bad pixel by laser repair is easy can be provided.

Moreover, in the above configuration, it is also possible to adopt a configuration in which the areas of the overlaps forming the at least two storage capacities are different. When a portion of a storage capacity with a defect, of two or more storage capacities, is separated, the storage capacity is cut of from the circuit configuration, so that the capacity of the storage capacity in the entire pixel is decreased. There is also the case that the liquid crystal capacity is decreased when a portion of the pixel electrode is separated. Thus, after separation of a portion of the pixel electrode, the ratio between storage capacity and liquid crystal capacity changes. However, when the areas of the overlaps constituting the storage capacities are different, as in the above-described configuration, so that the storage capacities are made different from one another, then it becomes possible to suppress fluctuations in the ratio between liquid crystal capacity and storage capacity. As a result the discrepancy to the brightness of normal pixels becomes small, and it can be prevented that the flicker properties are changed considerably, so that it is possible to provide a liquid crystal display device, in which bad pixels are not conspicuous.

Moreover, in the above configuration, it is also possible to adopt a configuration in which the switching elements are connected to the pixel electrodes via a drain electrode, wherein the drain electrode and/or the pixel electrode is provided with at least one separable compensation capacity electrode, which forms a compensation capacity by overlapping, via the insulating layer, with a portion of the corresponding gate line of the plurality of gate lines. With this configuration, even when the ratio of the sum of the liquid crystal capacity and the storage capacity to the compensation capacity changes due to cutting off a storage capacity with a defect of two or more storage capacities, the compensation capacity can be adjusted for example by separating a compensation capacity electrode. As a result, the ratio of the sum of the liquid crystal capacity and the storage capacity to the compensation capacity (also revered to in short as "ratio of the capacities" below) can be brought near the value in a normal pixel, and bad pixels in the display screen can be made even more inconspicuous.

Moreover, in the above configuration, it is also possible to adopt a configuration in which, if there is a plurality of compensation capacity electrodes, the areas of the overlaps of the compensation capacity electrodes with a portion of the gate line are different. With this configuration, the compensation capacities formed between the compensation electrodes and portions of the gate lines are caused to be different from one another by making the overlap areas of the compensation capacity electrodes with portions of the gate lines different. Thus, if a storage capacity is cut off, the capacity of the storage capacities can be further fine-tuned by for example, separating a plurality of compensation capacity as necessary, so that the ratio of the capacities can be brought even closer to the value in a normal pixel.

In order to achieve the above-stated object, an array substrate in accordance with the present invention includes a plurality of gate lines; a plurality of data lines provided such that the data lines intersect with the plurality of gate lines; switching elements associated with points where the plurality of gate lines and the plurality of data lines intersect, and which are connected to the gates lines and the data lines; pixel electrodes connected to the data lines via the switching elements; and opposing electrodes forming pairs with the pixel electrodes; wherein a plurality of storage capacities for maintaining a charge of the pixel electrodes are provided in a distributed arrangement associated with points where the plurality of gate lines and the plurality of data lines intersect.

In order to achieve the above-stated object, a liquid crystal television in accordance with the present invention, wherein a liquid crystal layer is formed between a pair of substrates, and wherein liquid crystal in the liquid crystal layer is driven by an electric field that is parallel to the substrate surface, wherein provided on one substrate of the pair of substrates are a plurality of gate lines, a plurality of data lines provided such that the data lines intersect with the plurality of gate lines, switching elements associated with points where the plurality of gate lines and the plurality of data lines intersect, and which are connected to the gates lines and the data lines, pixel electrodes connected to the data lines via the switching elements, and opposing electrodes forming pairs with the pixel electrodes, wherein the pixel electrodes overlap with a portion of the previous or subsequent gate line of the plurality of gate lines, and/or with a portion of the opposing electrode, at a plurality of locations via an insulating layer, and wherein at least two of the plurality of overlaps form storage capacities.

With this configuration, even when one of two ore more storage capacities is not operating normally due to an electrical short-circuit, and the storage capacity with the defect is cut off, fluctuations in the electrical potential level of the pixel electrode are suppressed by the other storage capacities, so that no extreme discrepancy in the brightness and flicker properties as compared to normal pixels occur. Thus, even in a liquid crystal television with large pixel size, repaired pixels can be made inconspicuous on the display screen, and the repaired pixels can be kept from becoming visible. Thus, a liquid crystal television is provided that can be manufactured with increased yield.

In order to achieve the above-stated object, a pixel repair method for a liquid crystal display device in accordance with the present invention, wherein a liquid crystal in a liquid crystal layer is driven by an electric field parallel to a substrate, the liquid crystal display device including a first substrate provided with a plurality of gate lines, a plurality of data lines provided such that the data lines intersect with the plurality of gate lines, switching elements associated with points where the plurality of gate lines and the plurality of data lines intersect and which are connected to the gates lines and the data lines, pixel electrodes connected to the data lines via the switching elements, and opposing electrodes forming pairs with the pixel electrodes; a second substrate in opposition to the first substrate; and a liquid crystal layer provided between the first substrate and the second substrate; wherein the pixel electrodes overlap with a portion of the previous or subsequent gate line of the plurality of gate lines and/or with a portion of the opposing electrodes, at a plurality of locations via an insulating layer; wherein at least two of the plurality of overlaps form storage capacities; includes, when an electrical short-circuit occurs at an overlap, separating in the pixel electrode a predetermined location on the switching element side in proximity to the short-circuit, or predetermined locations in front of and behind the proximity of the short-circuit.

With this method, when an electrical short-circuit occurs between the pixel electrode and a portion of the previous or subsequent gate line of the plurality of gate lines and/or a portion of the opposing electrodes, then the pixel electrode is separated at a predetermined location on the switching element side in proximity to the short-circuit, or at predetermined locations in front of and behind the proximity of the short-circuit, so that in the region of the pixel electrode that has not been cut off from the switching element, display is possible. Moreover, even when the portion of the pixel electrode that has been cut off relates to a storage capacity, since at least two storage capacities are provided, the other storage capacities fulfill the function of holding charges necessary for display. Thus, with this method, it can be prevented that the pixel turns into a pixel that does not illuminate, even when short-circuits occur at a plurality of overlap portions. In addition, when a short-circuit occur at an overlap portion constituting the storage capacity, the other storage capacities still function and compensate for that storage capacity, so that an extreme brightness drop of repaired pixels compared to normal pixels can be averted. Thus, with this method, the repaired pixels in the display screen can be made inconspicuous, and an increase in yield can be achieved.

In this method, separation can be performed in order starting with an overlapping portion furthest from the switching element. With this method, it can be prevented that portions of the pixel element that are related to overlap portions in which there is no short-circuit are needlessly cut off.

Furthermore, in this method, it is possible to inspect display of the pixel each time separation is performed in order starting with the overlapping portion furthest from the switching element.

Furthermore, in this method, if the pixel electrode overlaps between the previous or subsequent gate line and a portion of the opposing electrode, it is possible to perform separation after it has been determined whether an electrical short-circuit is occurring between the pixel electrode and the previous or subsequent gate line or between the pixel electrode and the opposing electrode. With this method, since storage capacities are formed between the pixel electrode and a portion of the previous or subsequent gate line and between the pixel electrode and a portion of the opposing electrode, as long as it has been found in which of the two the short-circuit occurs, the steps of separating the pixel electrode can be cut in half, which makes the task more efficient.

Furthermore, in this method, the pixel electrodes is provided with a plurality of pixel electrode portions that are disposed parallel to one another and generate a parallel electrical field between the pixel electrodes and the opposing electrodes, and an electrode linking portion for linking the plurality of pixel electrode portions; and if the storage capacities are formed by the electrode linking portions overlapping with a portion of the previous or subsequent gate line and/or a portion of the opposing electrode, and an electrical short-circuit occurs at the overlaps, the electrode linking portion with the short-circuit can be cut off from the pixel electrode by separating one or more predetermined locations in the pixel electrode.

Furthermore, in this method, the pixel electrodes is provided with a plurality of pixel electrode portions disposed parallel to one another, an electrode linking portion for linking the plurality of pixel electrode portions, and storage capacity electrodes for forming the storage capacities; and if the storage capacity electrodes form storage capacities by overlapping with a portion of the previous or subsequent gate line and/or a portion of the opposing electrode, and an electrical short-circuit occurs at the overlaps, the storage capacity electrode with the short-circuit can be cut off from the pixel electrode by separating one or more predetermined location in the pixel electrode.

Furthermore, in this method, if the storage capacity electrodes are connected to the pixel electrode portions via a connection electrode wire, the storage capacity electrode with the short-circuit can be cut off from the pixel electrode by separating a predetermined location in the connection electrode wire.

Moreover, in this method, the separation can be performed by irradiating laser light.

Moreover, in this method, before the separation, defect scanning can be performed in order to detect contaminants adhering to the first substrate, and furthermore, when a contaminant is detected, that contaminant can be removed by irradiating a laser on the contaminant. With this method, it can be prevented that repair by separation is extended to defects for which there is no need for separation, and thus, an increase in yield can be achieved.

In order to achieve the above-stated object, a drive method for a liquid crystal display device in accordance with the present invention, the liquid crystal display device including a first substrate provided with a plurality of gate lines, a plurality of data lines provided such that the data lines intersect with the plurality of gate lines, switching elements associated with points where the plurality of gate lines and the plurality of data lines intersect and which are connected to the gates lines and the data lines, pixel electrodes connected to the data lines via the switching elements, and opposing electrodes forming pairs with the pixel electrodes; a second substrate in opposition to the first substrate; and a liquid crystal layer provided between the first substrate and the second substrate; wherein the pixel electrodes overlap with a portion of the previous or subsequent gate line of the plurality of gate lines and/or with a portion of the opposing electrodes, at a plurality of locations via an insulating layer; wherein at least two of the plurality of overlaps form storage capacities; the method including if there is a repaired pixel that has been repaired by separating, for a bad pixel with an electrical short-circuit at an overlap, in the pixel electrode of that bad pixel a predetermined location on the switching element side in proximity to the short-circuit, or predetermined locations in front of and behind the proximity of the short-circuit, compensating a data signal applied to the repaired pixel and driving the pixel, based on information on the pixel location of the repaired pixel and the repaired location in the repaired pixel.

With this method, the storage capacity in a repaired pixel can be calculated from the repair position in the repaired pixel. Considering the drop in the brightness of the repaired pixel in comparison to normal pixels depending on this capacity, a compensated data signal is applied to the repaired pixel. As a result, it is possible to drive the pixels such that the brightness of the repaired pixel is close to the brightness of normal pixels, and thus, repaired pixels in the display screen can be made even more inconspicuous. It should be noted that, "compensated data signal" means a data signal with a voltage that is higher than the voltage of a data signal applied to a normal pixel. It is also possible to compensate data signals based on information on the pixel position and the repair position in repaired pixels.

BRIEF DESCRIPTION OF THE DRAWINGS

FIG. 3(a) shows the waveform of the gate voltage in the gate lines $X_{m-1}$ and $X_m$, while FIG. 3(b) shows a waveform diagram of the image signal voltage and the pixel electrode voltage.

FIG. 20(a) shows how a plurality of storage capacities are arranged in series. FIG. 20(b) shows how a plurality of storage capacities are arranged in parallel. FIG. 20(c) shows how the storage capacities are arranged in a loop.

BEST MODE FOR CARRYING OUT THE INVENTION

First Embodiment

Figure 1:
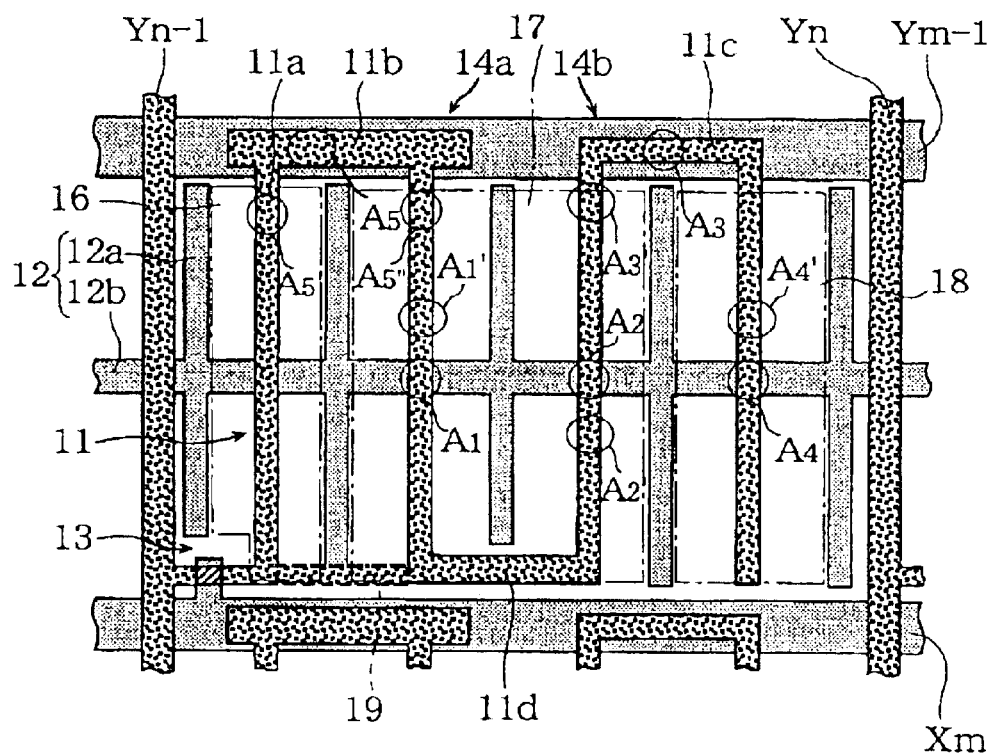
FIG. 1(a) is a plan view showing the arrangement of the pixel electrode structure, the opposing electrode structure, the wiring, and the like in a single pixel in the liquid crystal display device according to a first embodiment of the present invention.
FIG. 1(b) is a cross-sectional view showing that liquid crystal display device.
Figure 1:
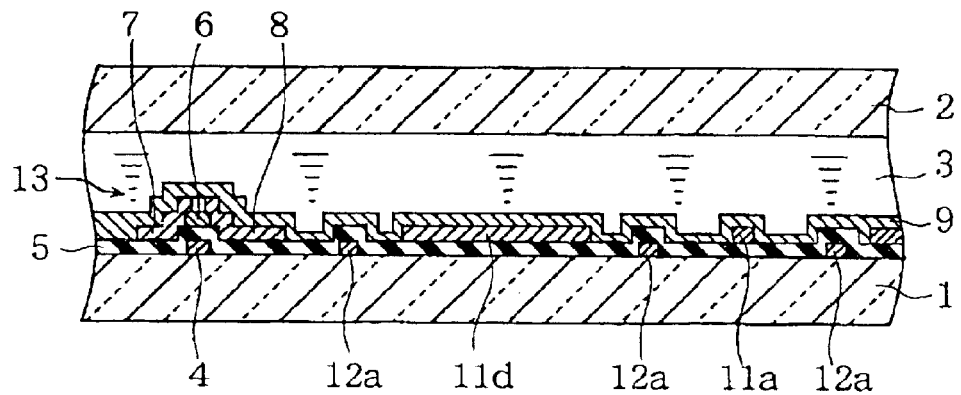

An active-matrix liquid crystal display device (hereafter, liquid crystal display device) of the IPS (In-Plane Switching) type according to the first embodiment of the present invention is described below. FIG. 1(a) is a plan view showing the arrangement of the pixel electrode structure, the opposing electrode structure, the wiring, and the like in a single pixel in a liquid crystal display device, and FIG. 1(b) is a cross-sectional view showing that liquid crystal display device. FIG. 2(a) is an equivalent circuit diagram showing the circuit configuration for an equivalent circuit of the liquid crystal display device, and FIG. 2(b) is an equivalent circuit diagram showing the circuit configuration for an equivalent circuit of a single pixel.

As shown in FIG. 1(b), the liquid crystal display device according to the first embodiment of the present invention has an array substrate 1 and an opposing substrate 2, each made of a glass substrate, for example, and disposed in opposition, and a liquid crystal layer 3 is provided between the two substrates.

As shown in FIG. 2(a), gate bus lines X and data bus lines Y are provided in a matrix on top of the array substrate 1, and TFTs 13 are provided as (active) switching elements at the intersecting locations of the gate bus lines X and the data bus lines Y. The gate lines (scanning lines) of the gate bus lines X are denoted as $X_1, X_2, \ldots X_{m-1}, X_m$ (m denotes the row number). The data lines (signal lines) of the data bus lines Y are denoted as $Y_1, Y_2, Y_3, \ldots Y_{n-1}, Y_n$ (n denotes the column number). Additionally, a pixel electrode structure (pixel electrode) 11 and an opposing electrode structure (opposing electrode) 12 forming a pair with the pixel electrode structure 11 are formed on each single pixel (hereafter, referred to simply as pixel), as shown in FIG. 1(a). The size of the pixel is width 211 µm×height 633 µm, for example in the case of 480 scanning lines in a 20 inch TV.

An alignment film (not shown in the drawings) for aligning the liquid crystal is formed on the array substrate 1 such that it covers the gate bus lines X, the data bus lines Y, the pixel electrode structure 11, the opposing electrode structure 12, the TFT 13, and the like.

On the other hand, an alignment film is also formed on the inner surface side of the opposing substrate 2. The alignment films are made of polyimide, for example, and their surface is subjected to a rubbing process using a conventional, publicly known method.

The TFT 13 is provided on the array substrate 1 and includes a gate electrode 4, an insulating layer 5 made of a silicon nitride ($SiN_x$) layer or the like, for example, an amorphous silicon layer (a-Si) 6 selectively provided on the insulating layer 5, a source electrode 7, a drain electrode 8, and a protective layer 9 made from a silicon nitride layer, for example. The source electrode 7 is connected to the data line $Y_{n-1}$. On the other hand, the drain electrode 8 is connected to the pixel electrode structure 11.

The pixel electrode structure 11 is an electrode structure in the shape of a long unbroken line with a plurality of pixel electrode portions 11a and electrode linking portions 11b to 11d linked in alternation. The pixel electrode portions 11a are disposed parallel to one another, and are also parallel to the data bus lines Y. The electrode linking portions 11b and 11c are disposed so that they overlap with a portion of the previous gate line $X_{m-1}$ via the insulating layer 5. In this way, storage capacity portions 14a and 14b are formed at the overlapping portions. Thus, the electrode linking portions 11b and 11c also function as storage capacity electrodes.

The opposing electrode structure 12 is an electrode structure with a plurality of opposing electrode portions 12a that are linked with an opposing electrode wire 12b at right angles. The opposing electrode portions 12a are disposed parallel to one another and also parallel to the pixel electrode portions 11a. Additionally, as is clear from the same drawing, the pixel electrode portions 11a and the opposing electrode portions 12a are disposed in alternation. The spacing distance between the pixel electrode portions 11a and the opposing electrode portions 12a is set at approximately 10 µM. The opposing electrode wire 12b is disposed at the center of a single pixel such that it is parallel to the gate bus lines X.

The storage capacity portions 14a and 14b are essential structural elements of the present invention, and their function is to inhibit fluctuations in the electric potential level of the pixel electrode structure 11 caused by charge leaks from the liquid crystal capacity $C_{LC}$. As explained earlier, the storage capacity portion 14a is formed by the electrode linking portion 11b overlapping with a portion of the previous gate line $X_{m-1}$. On the other hand, the storage capacity portion 14b is formed by the electrode linking portion 11c overlapping with a portion of the previous gate line $X_{m-1}$. Furthermore, the storage capacity portions 14a and 14b are provided between the gate line $X_{m-1}$ and the electrode linking portions 11b and 11c. The insulating layer 5 has a fixed layer thickness, but the areas of the electrode linking portions 11b and 11c are different. This causes the storage capacity $C_{st1}$ of the storage capacity portion 14a and the storage capacity $C_{st2}$ of the storage capacity portion 14b to differ from one another. For example, when the area of the electrode linking portion 11b is at 10,800 $\mu m^2$, and the area of the electrode linking portion 11c is at 7,200 $\mu m^2$, $C_{st1}=$ 2.16 pF, and the storage capacity $C_{st2}=1.44$ pF. The liquid crystal capacity $C_{LC}$ has been given as one capacity for the convenience of explanation, and as shown in FIG. 2(b), is actually the total sum of a liquid crystal capacity $C_{LC1}$, a liquid crystal capacity $C_{LC2}$, and a liquid crystal capacity $C_{LC3}$. Liquid crystal capacity $C_{LC1}$ is formed by a region 16 indicated by the dashed line in FIG. 1(a), liquid crystal capacity $C_{LC2}$ is formed by a region 17, and liquid crystal capacity $C_{LC3}$ is formed by a region 18.

The reason for providing storage capacity portions 14a and 14b in a single pixel is explained below.

Figure 2:
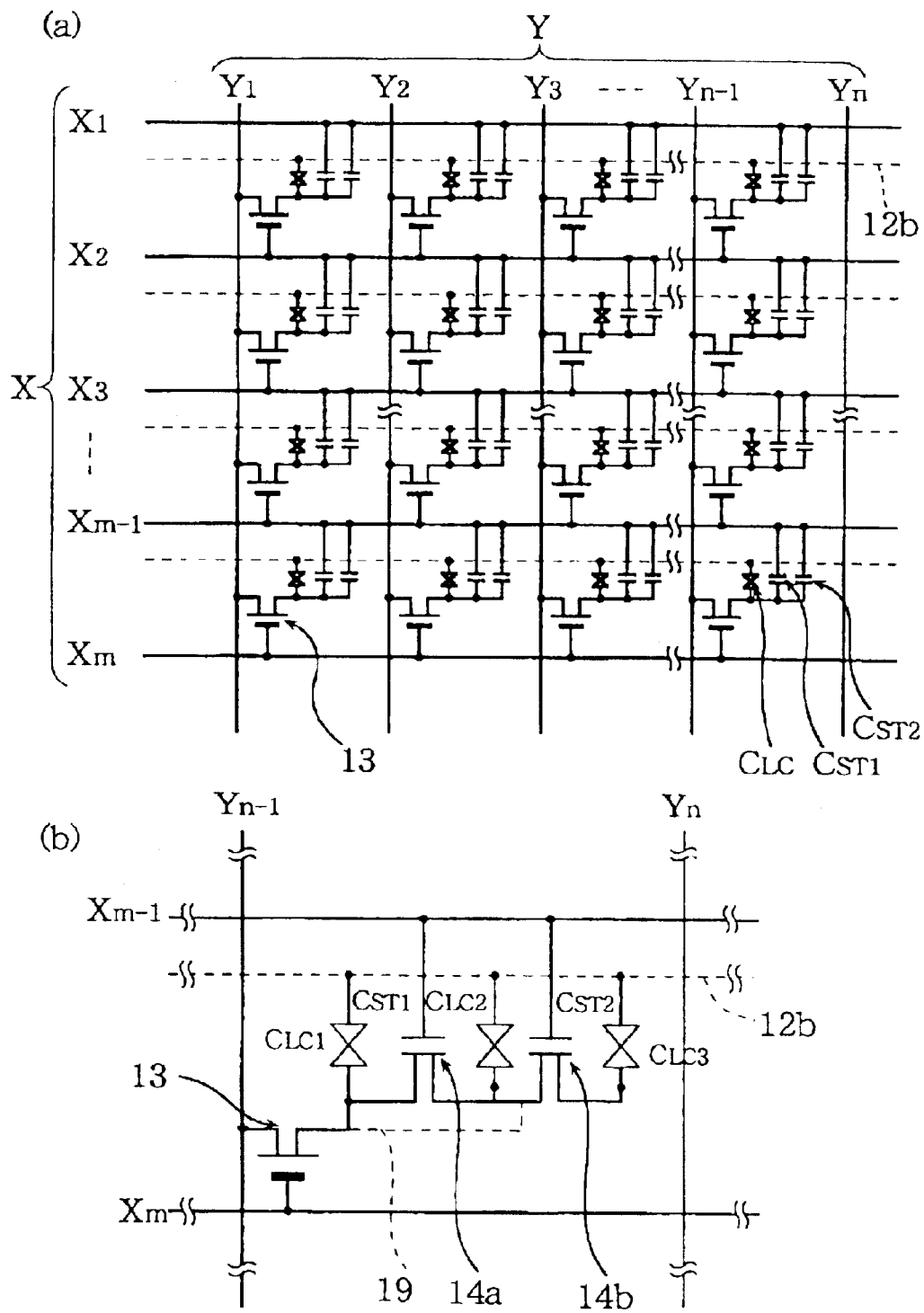
FIG. 2(a) is an equivalent circuit diagram showing the circuit configuration for an equivalent circuit of that liquid crystal display device.
FIG. 2(b) is an equivalent circuit diagram showing the circuit configuration for an equivalent circuit of a single pixel.

As shown in FIG. 1, when there is a defective location As in the storage capacity portion 14b resulting from an electrical short-circuit (hereafter, abbreviated simply as "short-circuit") between the gate line $X_{m-1}$ and the electrode linking portion 11c, laser repair is performed on a repair location $A_3'$, and the electrode linking portion 11b with a short-circuit defect is separated from the pixel electrode structure 11. Now, with conventional laser repairs methods, display defects were limited only to pixels with defective locations by cutting away pixels with defective locations from separate pixel groups that can be operated normally. By contrast, with the above-described configuration, because the normally functioning pixel electrode portion 11a and the storage capacity portion 14a are kept, the pixel can display, and can be prevented from becoming a bad pixel that cannot display. Additionally, because the storage capacity portion 14a also functions normally, electric potential level fluctuations in the pixel electrode structure 11 caused by charge leakage from the liquid crystal capacity $C_{LC1}$ and $C_{LC2}$ in the drivable regions 16 and 17 of the pixel can be suppressed. This prevents an extreme drop in brightness in the pixel after repair (hereafter, also referred to as "repaired pixel"), and inhibits the brightness gap between it and other normal pixels from increasing. The result is that display nonuniformities can be inhibited. In addition, bad pixels are repaired and become capable of display, so an increase in yield can also be achieved.

Similarly, when defective locations caused by short-circuits occur in $A_1, A_2$, or $A_4$, by performing laser repair on repair locations $A_1', A_2'$, or $A_4'$, respectively, the said pixel can be prevented from becoming a bad pixel that cannot be displayed.

The capacities of the storage capacity portion 14a and the storage capacity portion 14b are set to different to one another to accommodate changes in the liquid crystal capacity after laser repair. When one portion of the pixel electrode structure 11 is removed by laser repair, the cut off portion is no longer capable of driving the liquid crystal. Thus, laser repair reduces the liquid crystal capacity of the entire pixel. Additionally, cutting off a portion of the pixel electrode structure 11 by laser repair reduces the number of pixel electrode portions 11a capable of normal operation, and shortens the total length of the pixel electrode portions 11a, which changes the amount of charge leakage of the liquid crystal capacity (because the amount of charge leakage is proportional to the length of the pixel electrode portions 11a). Furthermore, charge leakage occurs from the TFT 13 as well. In view of these facts, it is preferable that the storage capacity portion 14a in pixels after repair has a capacity that can correspond to the charge leakage amount of the pixel electrode portions 11a that are capable of normal operation and the TFT 13. More specifically, it is preferable that the capacity of the storage capacity portion 14a is greater than the capacity of the storage capacity portion 14b. Repair locations for performing laser repair are set to any of $A_1'$ to $A_4'$ in advance, as explained above, so if laser repair is performed on any of these repair locations, it is possible to estimate in advance the capacity of the liquid crystal capacitance and the storage capacitance, and in what way those capacities will change relative to the capacity of the repaired capacitance. Thus, based on this estimation, the capacities of the storage capacity portion 14a and the storage capacity portion 14b can be set such that the ratio between the capacities does not significantly change. Establishing the capacities in this way makes it possible to set the voltage coupling amount from the previous gate line $X_{m-1}$ to substantially the same value, and although the brightness of the repaired pixel is somewhat lowered by the laser repair, threshold value properties can be set substantially equivalent to that of unrepaired normal pixels. When three or more storage capacity portions are provided, at least the storage capacity portion closest to the TFT 13 should have the greatest capacity. For example, when three storage capacity portions $\alpha$, $\beta$, and $\gamma$ are disposed in series in that order from the TFT 13, these storage capacity portions are provided such that their capacities fulfill the relationships of $\alpha>\beta=\gamma$, $\alpha>\beta>\gamma$, $\alpha=\beta>\gamma$, for example.

Providing the storage capacity portions 14a and 14b enables a capacitive coupling drive method that uses electric potential coupling with the gate line $X_{m-1}$. In this capacitive coupling drive method, as disclosed in Japanese Patent No. 2568659, a superimposed voltage is applied via the previous or subsequent gate lines or a separately provided common capacity line during the period when the switching element is off after temporarily writing an electric potential to the pixel. When this drive method is introduced, energy consumption is reduced, picture quality is improved, and an increase in reliability is attained.

Figure 3:
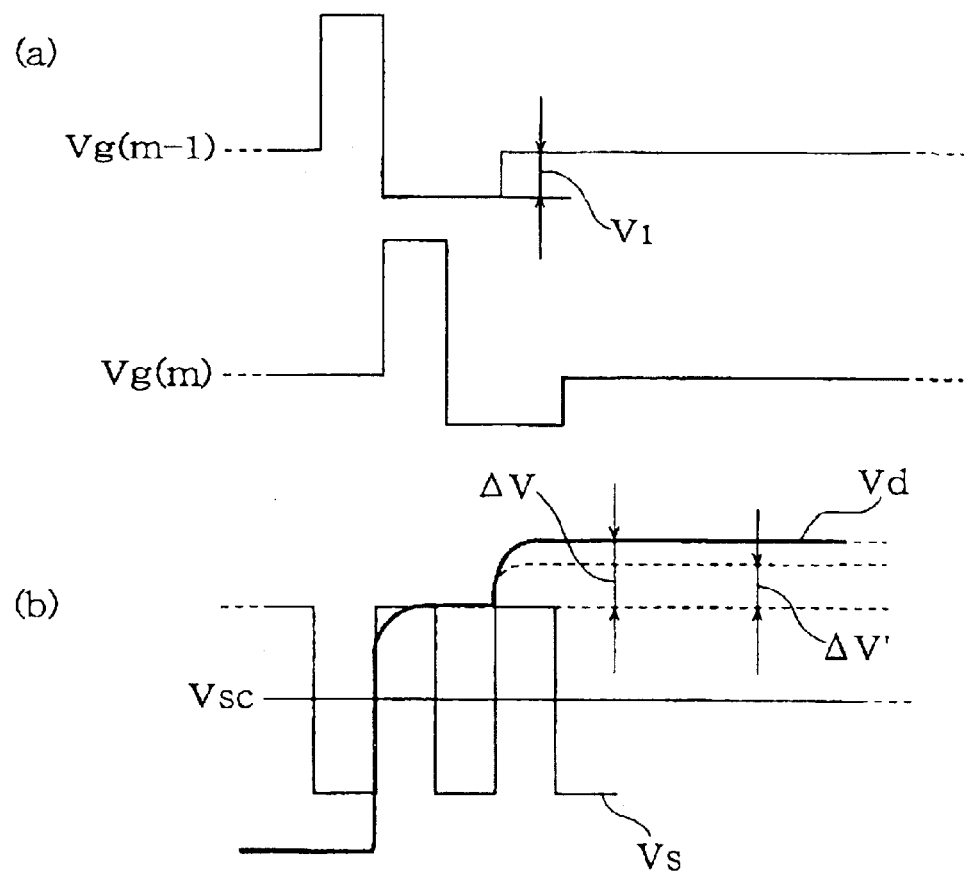
FIG. 3 is a voltage waveform diagram illustrating the capacitive coupling drive method in that liquid crystal display device.

The following is a further explanation of this capacitive coupling drive method. FIG. 3 is a voltage waveform diagram for explaining the capacitive coupling drive method in the liquid crystal display device according to this first embodiment. FIG. 3(a) shows the waveform of the gate voltage in the previous gate line $X_{m-1}$ and the present gate line $X_m$, and FIG. 3(b) shows a waveform diagram of the image signal voltage and the pixel electrode voltage. First, the case of a normal pixel will be described. When the present gate line $X_m$ is on, the pixel electric potential is charged by $V_g$ (signal voltage). After the present gate line $X_m$ is turned off, if a compensation voltage $V_1$ is superimposed on the previous gate line $X_{m-1}$, $\Delta V$ is superimposed on the pixel electrode potential Vd. Here, the superimposed voltage $\Delta V$ is given by $\Delta V=V_1\times(C_{st1}+C_{st2})/(C_{st1}+C_{st2}+C_{LC})$. On the other hand, in the case of repaired pixels formed by the application of laser repair to bad pixels, when there is a short-circuit, for example, in the storage capacity portion 14b, the storage capacity portion 14b cannot be operated because it has already been cut off. However, because the storage capacity portion 14a is capable of normal operation, if compensation voltage $V_1$ is superimposed on the previous gate line $X_{m-1}$ in the same way as described above, $\Delta V'$ is superimposed an the pixel electrode potential Vd. Here, the superimposed voltage $\Delta V'$ is given bys $\Delta V'=V_1\times C_{st1}/(C_{st1}+C_{st2}+C_{LC})$. Thus, in the liquid crystal display device according to the present embodiment, even repaired pixels after laser repair are capable of being driven by capacitive coupling. However, with conventional liquid crystal display devices, when laser repair is performed on bad pixels with defects in storage capacity portions, those storage capacity portions become inoperable, and thus the superimposed voltage $\Delta V$ is zero. Thus, in conventional liquid crystal display devices, repaired pixels can no longer be driven by capacitive coupling.

IPS mode liquid crystal display devices with a configuration such as that described above are manufactured by the method described below.

First, a vacuum deposition device is used to deposit a Cr thin film metallic layer with a film thickness of about 0.2 $\mu$m, for example, on one surface of a glass substrate made by Corning, Inc. (catalog no. 1737). Next, this Cr thin film metallic layer is patterned into a certain shape to selectively form the gate bus lines X, the gate electrode 4, and the opposing electrode structure 12. Hereafter, this substrate is called the array substrate. The gate electrode 4 is the electrode forming one portion of the TFTs 13, and connects with the gate lines $X_1, X_2, \ldots X_{m-1}$, and $X_m$. Also, the end of the gate lines $X_1, X_2, \ldots X_{m-1}$, and $X_m$ are patterned such that they form terminal electrodes that can connect with the gate signal drive circuit (the drive circuit for applying gate signals to the gate bus lines X).

Next, the insulating layer 5 (silicon nitride layer (SiN$_x$)) as a gate insulating layer, an amorphous silicon layer that hardly includes impurities and which is for forming the channel of an insulated gate transistor, and a silicon nitride layer as an inter-layer insulating layer are sequentially deposited over the entire surface of the glass substrate with a plasma CVD device. The layer thickness of these layers can be set to 0.3 $\mu$m, 0.05 $\mu$m, and 0.1 $\mu$m, respectively, for example. Next, by etching the silicon nitride layer, the silicon nitride layer can be selectively left only on the gate electrode 4, and the amorphous silicon layer is exposed in other regions on which the gate electrode 4 is not formed.

Next, a non-crystalline silicon layer that includes phosphorus as an impurity is formed over the entire surface of the glass substrate using a plasma CVD device. The layer thickness of this non-crystalline silicon layer is set to 0.05 $\mu$m, for example. Next, the amorphous silicon layer 6 is formed by etching the non-crystalline silicon layer. The amorphous silicon layer 6 includes phosphorus only in the channel portion, which is necessary for electrically connecting with the data bus lines Y.

Furthermore, an aluminum thin film with a film thickness of about 0.3 $\mu$m is deposited on the glass substrate using a vacuum deposition device, after which it is etched to selectively form the data bus lines Y, the source electrode 7, the pixel electrode structure 11, and the drain electrode 8. At this time, the source electrode 7 is formed such that it connects to the data line $Y_{n-1}$. The drain electrode 8 is formed such that it connects to the pixel electrode structure 11. Further, the ends of the data bus lines Y are patterned such that they form terminal electrodes that can be connected to the data signal drive circuit (the drive circuit for applying data signals to the data bus lines Y).

Next, a silicon nitride layer is deposited over the entire surface of the glass substrate to form the protective film 9 (passivation film). Furthermore, by removing both the silicon nitride layer serving as the inter-layer insulating layer and the protective film 9 on one end of the periphery of the glass substrate, the terminal electrodes provided on the end portion of the gate bus lines X are exposed. By removing the protective film 9 on the other end of the periphery of the array substrate, the terminal electrodes provided on the ends of the data bus lines Y are exposed. This makes it possible to connect the gate bus lines X and the data bus lines Y to the gate signal drive circuit or data signal drive circuit, respectively, which output electric signals to these bus lines.

Furthermore, an alignment film is formed on the protective film 9 with a conventional, publicly known method, thus completing the array substrate.

Next, the opposing substrate that forms a pair with the array substrate is manufactured. Specifically, first a color filter (not shown in the drawings) configured by a black matrix and R (red), G (green), and B (blue), is formed on a glass substrate. Furthermore, an alignment film is formed over this color filter, and the opposing substrate is manufactured. The black matrix is formed in a lattice arrangement that matches the wire locations of the gate bus lines X and the data bus lines Y when the array substrate and the opposing substrate are laminated to one another.

Next, after the array substrate and the opposing substrate have been laminated to one another, liquid crystal is injected with a conventional, publicly known method to form a liquid crystal layer, and thus a liquid crystal display panel is manufactured. Furthermore, the gate signal drive circuit and the data signal drive circuit are mounted at the periphery of this liquid crystal display panel, thereby completing the liquid crystal display device according to this first embodiment.

By further performing a detection process on the liquid crystal display device manufactured as above, bad pixels can be confirmed, and defective locations in those bad pixels are identified. More specifically, light detection is used to locate what wire the pixel electrode structure 11 short-circuits with. For example, if the liquid crystal display device manufactured with the above-mentioned method displays black when no voltage difference is applied between the pixel electrode structure 11 and the opposing electrode structure 12, then this means that there is a short-circuit between the pixel electrode structure 11 and the opposing electrode structure 12, if an alternating voltage is applied to the opposing electrode structure 12, and the display device displays black. On the other hand, if it displays white, a short-circuit is occurring between the previous gate line $X_{m-1}$ and the pixel electrode structure 11.

Moreover, with this detection process, in the event that defective locations are specified, those bad pixels are repaired. For repairing bad pixels, ablation by the irradiation of laser light, for example, can be used. The laser light is first irradiated on the repair location $A_4'$, which is the repair location farthest from the TFT 13, and after light detection is performed, it is determined whether the bad pixel has been repaired. If it has not been repaired, laser light is further illuminated on the repair location $A_3'$, which is closer to the TFT 13 than the repair location that was initially irradiated with laser light, and then light detection is performed again. Thereafter, the irradiation of laser light and the light detection procedure is repeatedly performed until the defective location has been repaired.

By repeating the above-described procedure, the liquid crystal display panel can be examined after repair is performed. In bad pixels before repair, the entire pixel is a black display, but by repairing them with laser light irradiation, a region of one portion of the bad pixel can be used for display. Thus, in the display screen, pixel defects can be made inconspicuous and the yield can be improved.

In this first embodiment, as shown in FIG. 1, a bypass line 19 for bypassing the storage capacity portion 14a can be provided. The bypass line 19 prevents the normally operational storage capacity portion 14b, for example, from being simultaneously cut off when there is a defective location $A_5$ resulting in a short-circuit in the storage capacity portion 14a and laser repair must be performed on a repair location $A_5'$. This enables the liquid crystal to be driven in all regions of the pixel, and achieves an even greater improvement in yield. If the bypass line 19 is provided, however, it is necessary to perform laser repair on a repair location $A_5''$ in addition to the aforementioned repair location $A_5'$.

Figure 4:
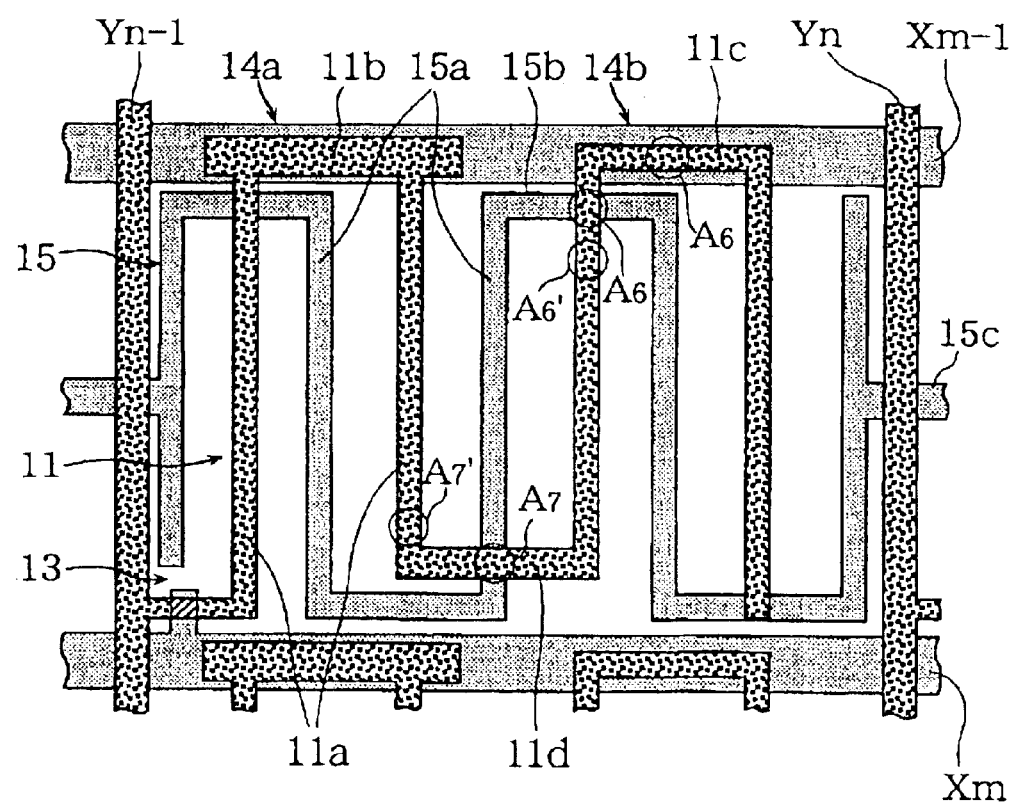
FIG. 4 is a plan view showing the arrangement of the pixel electrode structure, the opposing electrode structure, the wiring, and the like in a single pixel in another liquid crystal display device according to the first embodiment.

Alternatively, in this first embodiment, an electrode structure with the plane shape shown in FIG. 4 can be used for the opposing electrode structure. FIG. 4 is a plan view showing the arrangement of the pixel electrode structure, the opposing electrode structure, the wiring, and the like in a single pixel in another liquid crystal display device according to the present embodiment.

As shown in FIG. 4, an opposing electrode structure (opposing electrode) 15 is an electrode structure of a long unbroken line shape wherein a plurality of opposing electrode portions 16a and an electrode linking portions 15b are alternately linked to one another. Moreover, the opposing electrode structure 15 is provided with a connection electrode 15c for connecting to the opposing electrode structure in the adjacent pixel and which is disposed on the opposing electrode portion 16a furthest from the TFT 13.

When the opposing electrode structure 16 with this plane shape is used, it is conceivable that the two locations where short-circuits could occur are a defective location $A_6$ and a defective location $A_7$. When laser repair is performed on these defective locations, repair can be performed on a repair location $A_6'$ for the defective location $A_6$, and a repair location $A_7'$ for the defective location $A_7$. Thus, with the aforementioned configuration, the number of defective locations that could occur is reduced, and along with this a reduction in the number of repair locations can be achieved.

Second Embodiment

Figure 5:
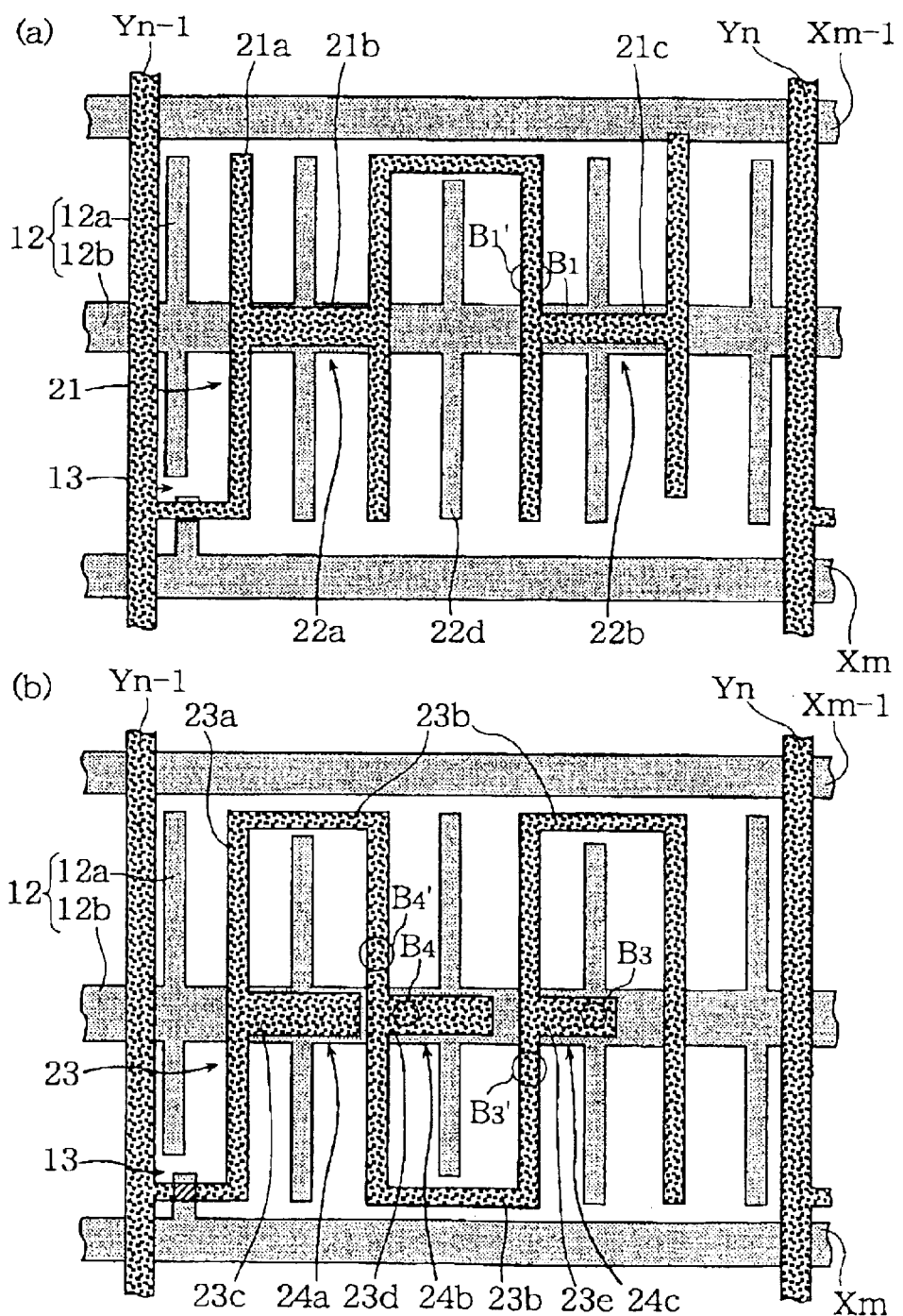
FIG. 5(a) is a plan view showing the arrangement of the pixel electrode structure, the opposing electrode structure, the wiring, and the like in a single pixel in the liquid crystal display device according to a second embodiment of the present invention.
FIG. 5(b) is a plan view showing the arrangement of the pixel electrode structure, the opposing electrode structure, the wiring, and the like in a single pixel in another liquid crystal display device according to that second embodiment.

A second embodiment of the present invention is explained below with reference to FIG. 5(*a*) and FIG. 5(*b*). FIG. 5(*a*) is a plan view showing the arrangement of the pixel electrode structure, the opposing electrode structure, the wiring, and the like in a single pixel in the liquid crystal display device according to the present embodiment. FIG. 5(*b*) is a plan view showing the arrangement of the pixel electrode structure, the opposing electrode structure, the wiring, and the like in a single pixel in another liquid crystal display device according to the present embodiment.

The liquid crystal display device according to this second embodiment differs from the liquid crystal display device according to the above-mentioned first embodiment mainly in the feature of providing storage capacity portions between the pixel electrode structures and the opposing electrode structures. A more specific explanation of this divergent feature follows below.

As shown in FIG. 5(*a*), a pixel electrode structure (pixel electrode) 21 according to this second embodiment is made of pixel electrode portions 21a disposed parallel to one another and electrode linking portions 21b to 21d linking the pixel electrode portions 21a. The electrode linking portions 21b and 21c are provided on the opposing electrode wire 12b via a silicon nitride layer, thus forming storage capacity portions 22a and 22b, respectively, between them and the opposing electrode wire 12b.

Here, the areas of the electrode linking portions 21b and 21c are different. This causes the storage capacity of the storage capacity portion 22a to differ from the storage capacity of the storage capacity portion 22b. For example, when the area of the electrode linking portion 21b is set to 10,800 $\mu m^2$, and the area of the electrode linking portion 21c is set to 7,200 $\mu m^2$, the capacity of the storage capacity portion 22a is 2.16 pF, and the capacity of the storage capacity portion 22b is 1.44 pF.

In a liquid crystal display device with the above-described configuration, when there is a defective location $B_1$ in the storage capacity portion 22b resulting in a short-circuit between the opposing electrode wire 12b and the electrode linking portion 21c, it is possible to separate the electrode linking portion 21c with the short-circuit defect from the pixel electrode structure 21 by performing laser repair on a repair location $B_1$'. Thus, because the repaired pixel retains pixel electrode portions 21a, which are capable of normal operation, the repaired pixel is capable of being displayed, and can be prevented from becoming a bad pixel that cannot display. The result is that an increase in yield becomes possible. Also, repaired pixels are not only capable of display, but are also inhibited from dropping in brightness and prevented from significantly differing in flicker properties in comparison to other normal pixels. The reason for this is that the normally operating storage capacity portion 22a is retained. The result is that the occurrence of display nonuniformities can also be suppressed. Furthermore, because the storage capacity portions are not provided on the gate line $X_{m-1}$, waveform distortion of the gate voltage does not increase by boosting the gate line time constant. Thus, a liquid crystal display device can be provided that is capable of a large-scale, uniform display.

In this second embodiment, it is further possible to use the configuration shown in FIG. 5(b). That is, in place of the pixel electrode structure 21, it is possible to provide a pixel electrode structure 23 that is made of pixel electrode portions 23a, electrode linking portions 23b linking the electrode portions 23a, and storage capacity electrodes 23c to 23e provided on the opposing electrode wire 12b via an insulating layer, such as a silicon nitride layer or the like, and which are connected to the pixel electrode portions 23a.

The pixel electrode portions 23a are disposed parallel to one another, and are provided parallel to the data bus lines Y as well. Additionally, the storage capacity electrodes 23c to 23e are provided on the opposing electrode wire 12b via the insulating layer 5, and form storage capacity portions 24a and 24b with a portion of the gate line $X_{m-1}$.

Here, the areas of the storage capacity electrodes 23c to 23e are different from one another. This causes the storage capacity of the storage capacity portion 24a, the storage capacity of the storage capacity portion 24b, and the storage capacity of a storage capacity portion 24c to differ from one another. For example, when the area of the storage capacity electrode 23c is set to 7,200 $\mu m^2$, the area of the storage capacity electrode 23d is set to 7200 $\mu m^2$, and the area of the storage capacity electrode 23e is set to 3600 $\mu m^2$, then the capacity of the storage capacity portion 24a is 1.44 pF, the capacity of the storage capacity portion 24b is 1.44 pF, and the capacity of the storage capacity portion 24c is 0.72 pF.

In a liquid crystal display device with this configuration, when there is a defective location $B_3$ in the storage capacity portion 24c resulting in a short-circuit between the opposing electrode wire 12b and the storage capacity electrode 23e, the storage capacity electrode 23e with that short-circuit defect is separated from the pixel electrode 23 by performing laser repair on a repair location $B_3$'. Moreover, when there is a defective portion $B_4$ in the storage capacity portion 24b, the storage capacity electrode 23d with the short-circuit defect is separated from the pixel electrode 23 by performing laser repair on a repair location $B_4$'. In the same way as mentioned earlier, this achieves an improvement in yield and can also provide a liquid crystal display device capable of producing a large-scale, uniform display.

Third Embodiment

Figure 6:
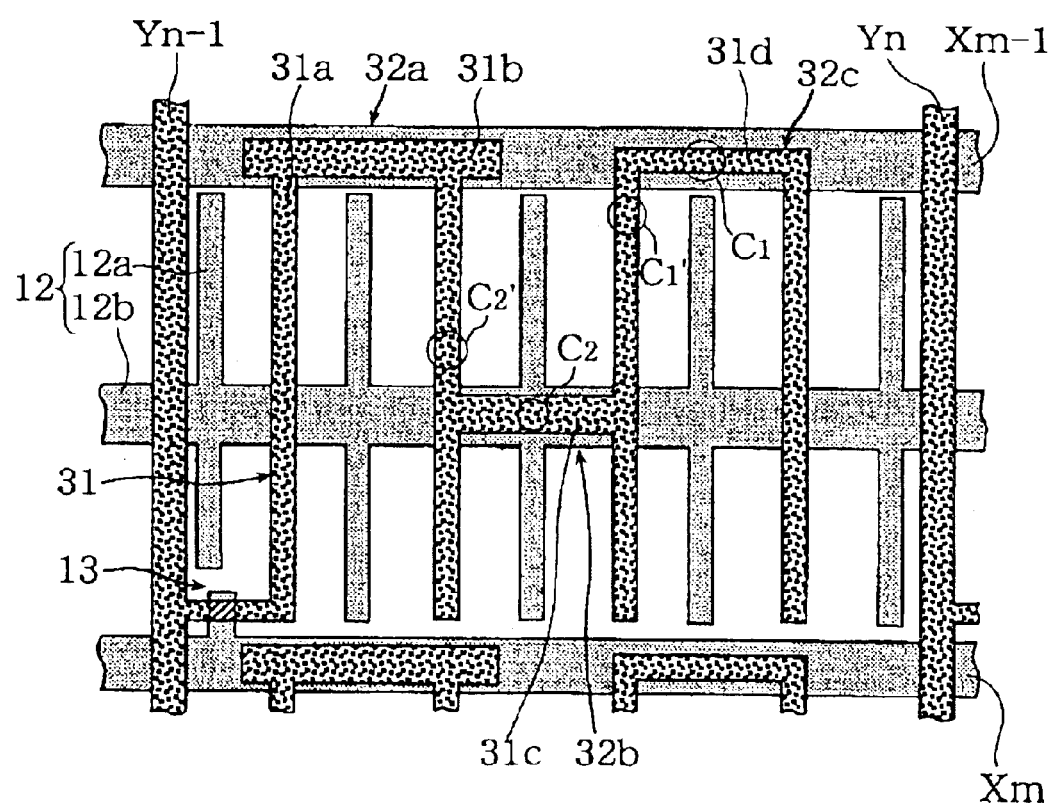
FIG. 6 is a plan view showing the arrangement of the pixel electrode structure, the opposing electrode structure, the wiring, and the like in a single pixel in the liquid crystal display device according to a third embodiment of the present invention.

A third embodiment of the present invention is explained below with reference to FIG. 6. FIG. 6 is a plan view showing the arrangement of the pixel electrode structure, the opposing electrode structure, the wiring, and the like in a single pixel in the liquid crystal display device according to the present embodiment.

The liquid crystal display device according to this third embodiment differs from the liquid crystal display device according to the first embodiment mainly in that storage capacity portions are further provided between the pixel electrode structures and the opposing electrode structures. A more specific explanation with regard to this difference follows below.

As shown in FIG. 6, a pixel electrode structure (pixel electrode) 31 according to this third embodiment is made of pixel electrode portions 31a disposed parallel to one another, and electrode linking portions 31b to 31d linking the pixel electrode portions 31a. The electrode linking portions 31b and 31d are provided on the previous gate line $X_{m-1}$ via the insulating layer 5, thus forming storage capacity portions 32a and 32c, respectively, between the electrode linking portions 31b to 31d and the gate line $X_{m-1}$. On the other hand, the electrode linking portion 31c is provided on the opposing electrode wire 12b via the insulating layer 5, thus forming a storage capacity portion 32b between the electrode linking portion 31c and the opposing electrode wire 12b. That is, the electrode linking portions 31b to 31d also function as storage capacity electrodes.

Here, the areas of the electrode linking portions 31b to 31d are different from one another. This causes the capacity of the storage capacity portion 32a, the capacity of the storage capacity portion 32b, and the capacity of the storage capacity portion 32c to differ from one another. For example, when the area of the electrode linking portion 31b is set to 7,200 $\mu m^2$, the area of the electrode linking portion 31c is set to 7,200 $\mu m^2$, and the area of the electrode linking portion 31d is set to 3,600 $\mu m^2$, the capacities of the storage capacity portions 32a and 32b are 1.44 pF, and the capacity of the storage capacity portion 82c is 0.72 pF.

In a liquid crystal display device with this configuration, when there is a defective location $C_1$ in the storage capacity portion 32c resulting in a short-circuit between the gate line $X_{m-1}$ and the electrode linking portion 31d, the electrode linking portion 31d with the short-circuit defect is cut off from the pixel electrode structure 31 by performing laser repair on a repair location $C_1$'. Additionally, when there is a defective location $C_2$ in the storage capacity portion 32b, the electrode linking portion 31c with the short-circuit defect is cut off from the pixel electrode structure 31 by performing laser repair on a repair location $C_2$'. This leaves normally operational pixel electrode portions 31a in the repaired pixel, so the repaired pixel can be displayed, and is prevented from becoming a bad pixel that cannot display. Thus, it becomes possible to increase yield. Furthermore, when laser repair is performed on the repair location $C_1$', the storage capacity portions 32a and 32b are capable of normal operation, while when laser repair is performed on the repair location $C_2$', the storage capacity portion 32a is capable of normal operation. This not only enables the repaired pixel to display, but also inhibits it from dropping in brightness compared to other, normal pixels. The result is that the occurrence of display nonuniformities can also be suppressed.

When storage capacity portions, which easily short-circuit, are divided up and provided on the previous gate line $X_{m-1}$ and the opposing electrode wire 12b, spots where short-circuits occur can be easily identified by inspection. For that method of inspection, the following method, for example, can be used.

First, the entire surface of the display screen of the liquid crystal display device is illuminated, which identifies bad pixels displaying black.

Next, a gate voltage is, applied to the present gate line $X_m$, which turns the bad pixel on and off, and the TFT 13 of the bad pixels is operated. At this time, the data line $Y_{n-1}$ for writing the image signal on the bad pixel is set to 0V.

Here, when detection is performed by an electrical method, the following steps (1) and (2) are performed (1) A gate voltage of 5V is applied to the previous gate line $X_{m-1}$, and a voltage of 0V is applied to the opposing electrode structure 12.

(2) A gate voltage of 0V is applied to the previous gate line $X_{m-1}$, and a voltage of 5V is applied to the opposing electrode structure 12.

The above-mentioned (1) and (2) are performed, and the current through the pixel electrode structure 31 in each case is inspected.

The result is that, for example, if a short-circuit is occurring at the storage capacity portion 32c, when (1) is performed, after time has passed for the liquid crystal capacity to charge, the current through the pixel electrode structure 31 becomes 0. On the other hand, when (2) is performed, electrical current continues to flow through the pixel electrode structure 31.

Moreover, if a short-circuit is occurring at the storage capacity portion 32b, when (1) is performed the current continues to flow, whereas when (2) is performed, the current through the pixel electrode structure 31 becomes 0 after a certain amount of time has passed.

The result of this inspection is that it can be determined whether defects such as short-circuits and the like are occurring in the storage capacity portion 32c provided between the previous gate line $X_{m-1}$ and the pixel electrode portion 31a, or if they are occurring in the storage capacity portion 32b provided between the opposing electrode wire 12b and the electrode linking portion 31c.

Further, in place of the aforementioned electrical method, the location of short-circuits can also be determined by an optical method. With this method, a gate voltage of 0V is applied to the previous gate line $X_{m-1}$ of the bad pixel, and an alternating voltage of ±5V is applied to the opposing electrode structure 12. If this causes a short-circuit in the storage capacity portion 32b, which is provided between the opposing electrode wire 12b and the electrode linking portion 31c, the bad pixel is not illuminated. If it illuminates, then that means that the short-circuit is occurring outside of the storage capacity portion 32b.

When it is determined whether defective locations are in the previous gate line $X_{m-1}$ or in the opposing electrode wire 12b by performing the above inspections, then the selection of repair locations for the subsequent laser repair can be easily carried out. For example, if a defect can be located in the opposing electrode wire 12b, the repair location $C_1{}'$ can be automatically dropped from that selection, and the operation efficiency can be improved.

Fourth Embodiment

Figure 7:
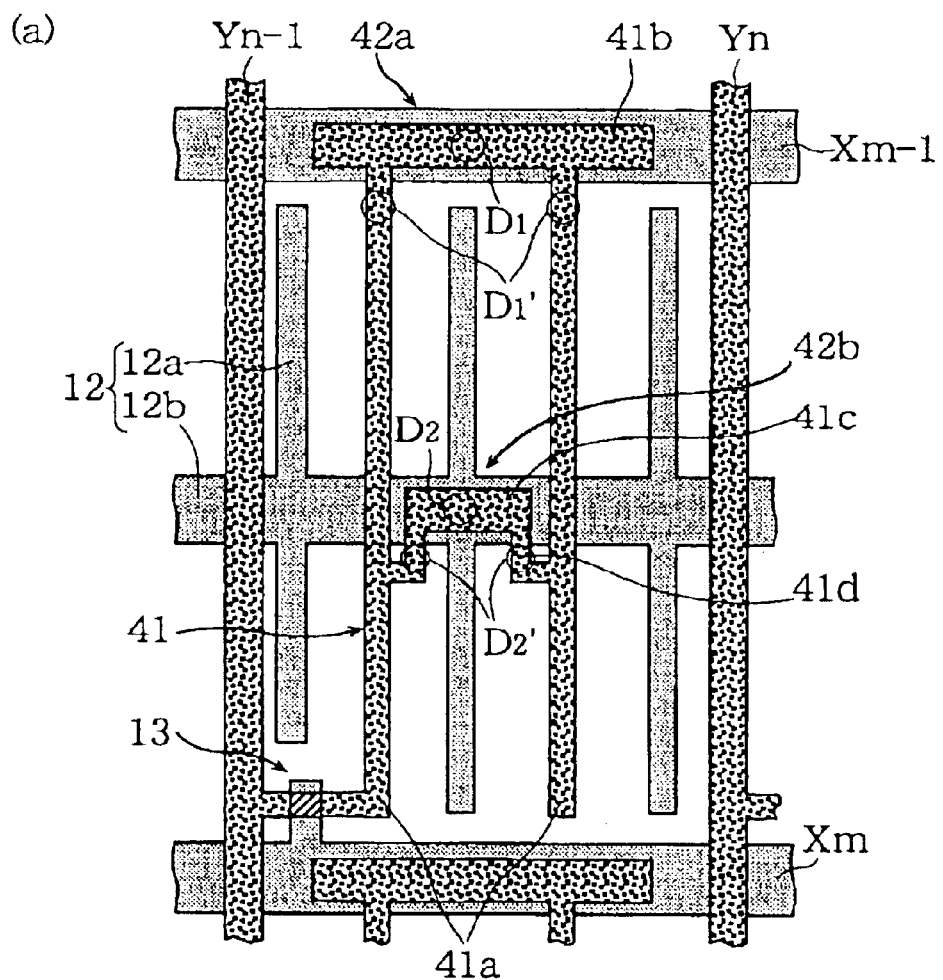
FIG. 7(a) is a plan view showing the arrangement of the pixel electrode structure, the opposing electrode structure, the wiring, and the like in a single pixel in the liquid crystal display device according to a fourth embodiment of the present invention.
FIG. 7(b) is a cross-sectional view of that liquid crystal display device.
Figure 7:
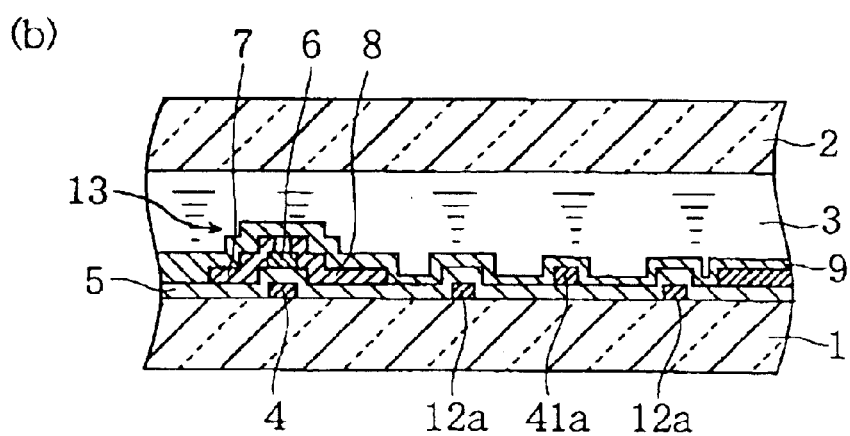
Figure 8:
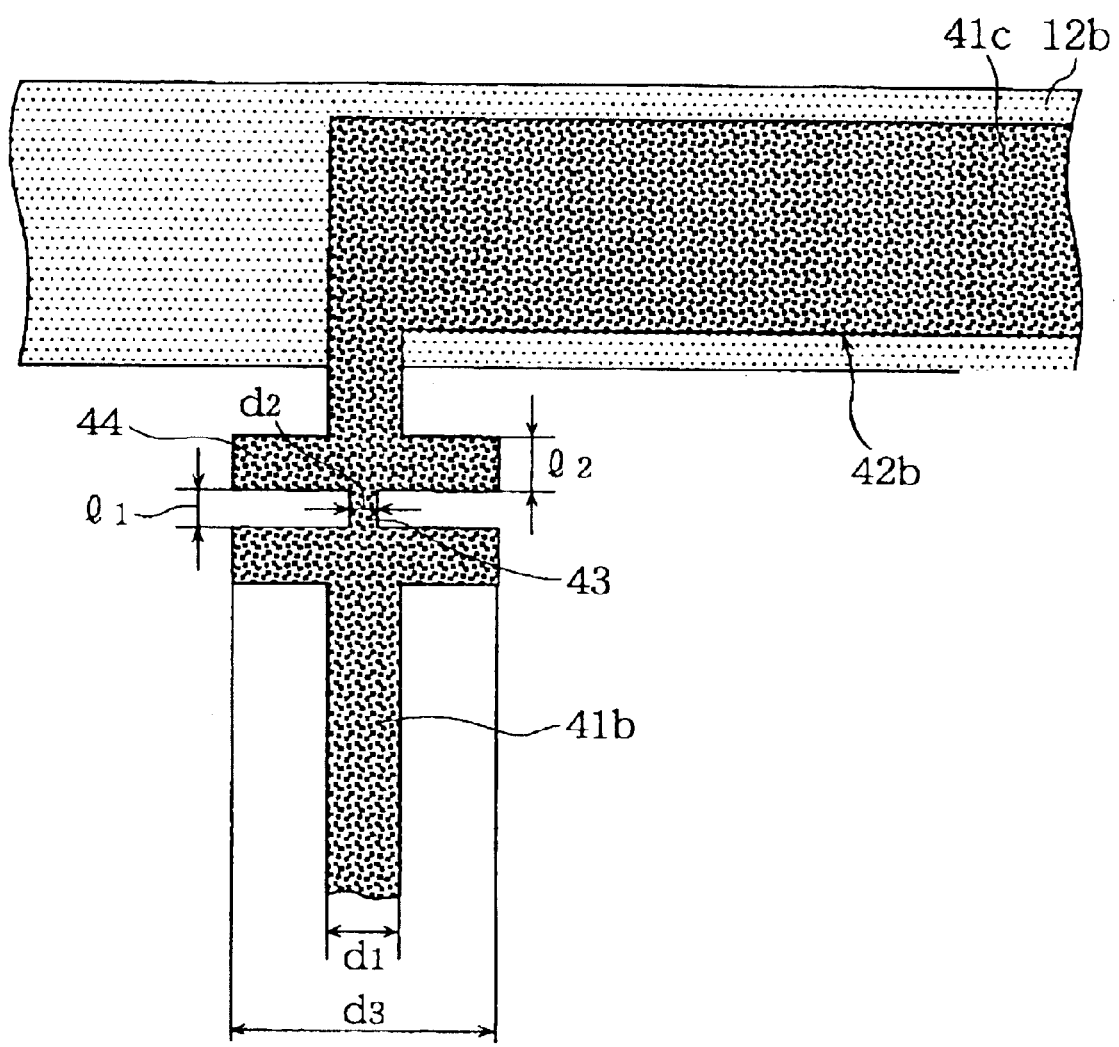
FIG. 8 is a plan view showing the essential components of the pixel electrode structure in that liquid crystal display device.

A fourth embodiment of the present invention is explained below with reference to FIG. 7 and FIG. 8. FIG. 7(a) is a plan view showing the arrangement of the pixel electrode structure, the opposing electrode structure, the wiring, and the like in a single pixel in a liquid crystal display device, and FIG. 7(b) is a cross-sectional view of the liquid crystal display device. FIG. 8 is a plan view showing the essential components of the pixel electrode structure.

The liquid crystal display device according to the present fourth embodiment has in common with the other liquid crystal display device according to the above-mentioned third embodiment the aspect of providing storage capacity portions between the pixel electrode structure and the previous gate line, and between the pixel electrode structure and the opposing electrode structure, but the two embodiments differ in that the two storage capacity portions are disposed in parallel. A more specific explanation of this difference follows below.

As shown in FIG. 7(a), a pixel electrode structure (pixel electrode) 41 according to this fourth embodiment includes a plurality of pixel electrode portions 41a, electrode linking portions 41b linking the pixel electrode 5 portions 41a, a storage capacity electrode 41c provided on the opposing electrode wire 12b, and connection electrode wires 41d for connecting the plurality of pixel electrode portions 41a and the storage capacity electrode 41c.

The pixel electrode portions 41a are disposed parallel to one another, and are provided parallel with respect to the data bus lines Y as well.

The electrode linking portion 41b is provided on the previous gate line $X_{m-1}$ via the insulating layer 5, and forms a storage capacity portion 42a with a portion of the gate line $X_{m-1}$. That is, the electrode linking portion 41b, which overlaps with the gate line $X_{m-1}$, also functions as a storage capacity electrode.

Additionally, the storage capacity electrode 41c is provided on the electrode linking portion 12b via the insulating layer 5, and forms a storage capacity portion 42b with a portion of the electrode linking portion 12b.

Furthermore, as shown in FIG. 8, the connection electrode wires 41d are provided with separation portions 43 that can be easily separated when irradiating laser light, and marking portions 44 for enabling the easy confirmation of the separation portions 43. The wire width $d_2$ of the separation portions 43 (for example, 4 μm) is thinner than the wire width $d_1$ (for example, 8 μm) of the electrode linking portion 12b, and the separation portions 43 are easily separated by the irradiation of laser light. The length $l_1$ of the separation portions 43 can be set to 10 μm, for example. Moreover, the marking portions 44 are disposed such that they sandwich the separation portions 43, making it easy to locate the separation portions 43. The wire width $d_3$ (for example, 20 μm) of the marking portions 44 is thicker than the wire width $d_1$ (for example, 8 μm) of the electrode linking portion 12b. The length $l_2$ of the marking portions 44 can be set to 20 μm, for example.

The separation portions according to the present invention are not restricted to the aforementioned separation portions 43, and by choosing their shape and size in accordance with the irradiation point of the laser, for example, the design can be suitably altered if necessary. The marking portions according to the present invention are not limited to the marking portions 44, but must at least have a size that can be discerned by microscopic observation. Moreover, the shape can be suitably altered if necessary.

In a liquid crystal display device with this configuration, when there is a defective location $D_1$ in the storage capacity portion 42a resulting in a short-circuit between the gate line $X_{m-1}$ and the electrode linking portion 41b, the electrode linking portion 41b with the short-circuit defect is separated from the pixel electrode structure 41 by performing laser repair on the two repair locations $D_1{}'$ and $D_1{}'$ in front of and behind the defective location $D_1$. Or, when there is a defective location $D_2$ in the storage capacity portion 42b, the storage capacity electrode 41c with the short-circuit defect is separated from the pixel electrode structure 41 by performing laser repair on the two repair locations $D_2'$ and $D_2'$. With a structure wherein the storage capacity portion 42a and the storage capacity portion 42b are arranged in parallel in the present embodiment, all regions of the pixel can be operated after it has been repaired because even if one of the two storage capacity portions is cut off, the other storage capacity portion is able to operate normally. Thus, the existence of bad pixels can be made even less conspicuous, and the yield is increased.

Fifth Embodiment

Figure 9:
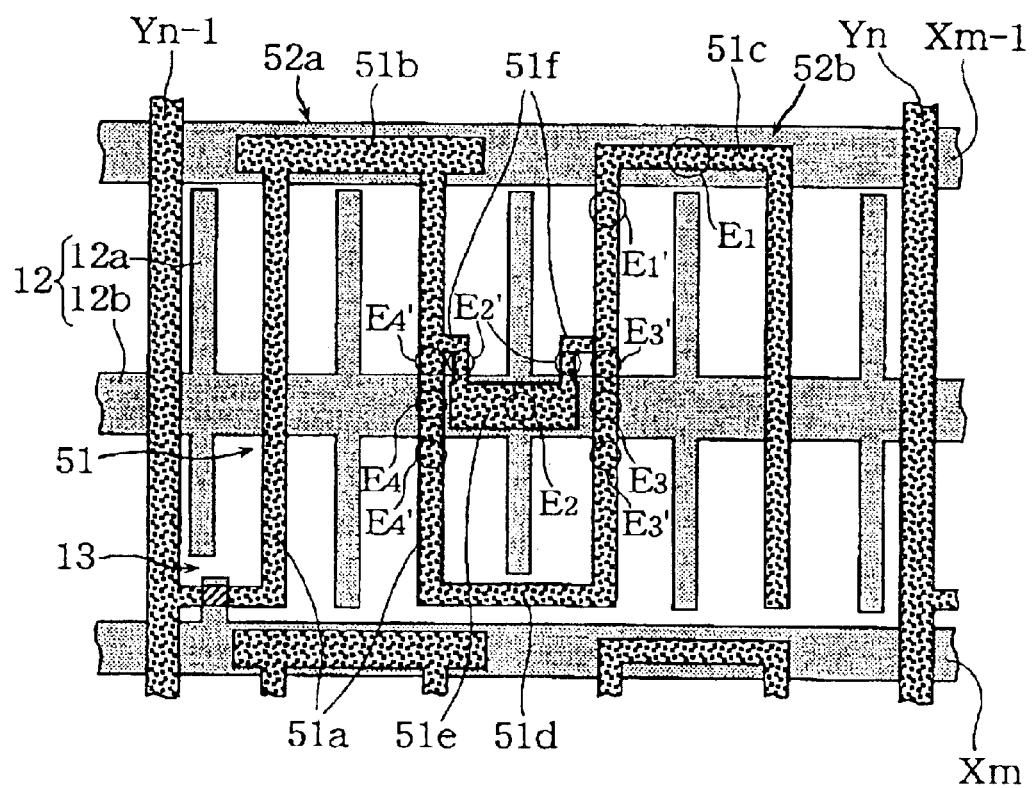
FIG. 9 is a plan view showing the arrangement of the pixel electrode structure, the opposing electrode structure, the wiring, and the like in a single pixel in the liquid crystal display device according to a fifth embodiment of the present invention.

A fifth embodiment of the present invention is described below with reference to FIG. 9. FIG. 9 is a plan view showing the arrangement of the pixel electrode structure, the opposing electrode structure, the wiring, and the like in a single pixel of a liquid crystal display device.

The liquid crystal display device according to this fifth embodiment differs from the other liquid crystal display device according to the first embodiment in that another storage capacity portion is further disposed in parallel between the pixel electrode structure and the opposing electrode structure.

More specifically, as shown in FIG. 9, a pixel electrode structure (pixel electrode) 51 includes a plurality of pixel electrode portions 51a, electrode linking portions 51b to 51d linking the pixel electrode portions 51a, a storage capacity electrode 51e provided on the opposing electrode wire 12b, and connection electrode wires 51f for connecting the pixel electrode portions 51a and the storage capacity electrode 51e. The connection electrode wires 51f can have the structure described in the above-mentioned fourth embodiment that includes separation portions and marking portions.

In a liquid crystal display device with this configuration, when there are defective locations $E_1$ to $E_4$ resulting in short-circuits, laser repair can be performed on a repair location $E_1'$ with respect to the defective location $E_1$, on two repair locations $E_2'$ and $E_2'$ with respect to the defective location $E_2$ that are located in front of and behind the same, on two repair locations $E_3'$ and $E_3'$ with respect to the defective location $E_3$ that are located in front of and behind the same, and on two repair locations $E_4'$ and $E_4'$ with respect to the defective location $E_4$ that are located in front of and behind the same.

With the pixel electrode structure 51 of the aforementioned configuration, especially when laser repair is performed only on the repair location $E_3'$ or the repair location $E_4'$, the electrode linking portion 51c can maintain its connection with the TFT 13 via the storage capacity electrode 51e, for example. Consequently, the storage capacity portion 52b can operate normally even after repair has been performed. The result is that in the repaired pixel, fluctuations in the electric potential level of the pixel electrode 51 can be inhibited on a par with normal pixels, even if there is charge leakage from the liquid crystal capacity.

Sixth Embodiment

Figure 10:
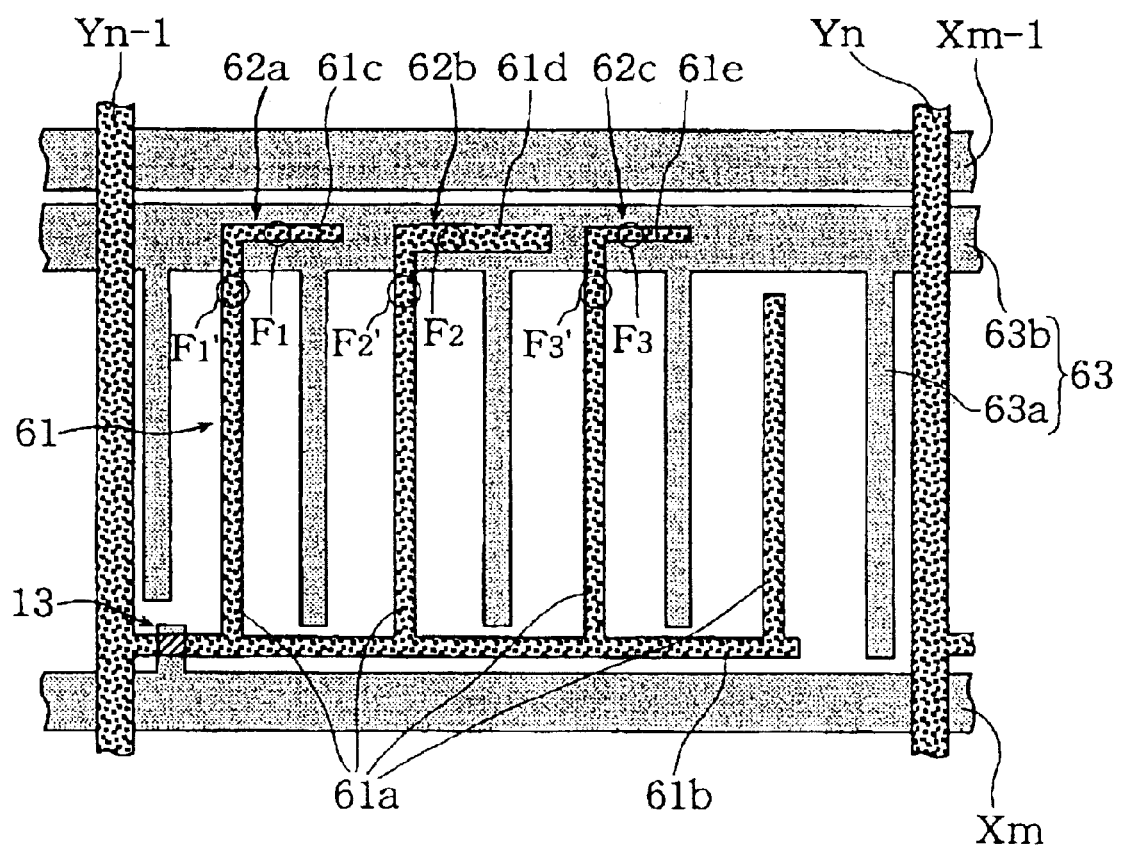
FIG. 10 is a plan view showing the arrangement of the pixel electrode structure, the opposing electrode structure, the wiring, and the like in the single pixel of a liquid crystal display device according to a sixth embodiment of the present invention.

A sixth embodiment of the present invention is described below with reference to FIG. 10 and FIG. 11. FIG. 10 is a plan view showing the arrangement of the pixel electrode structure, the opposing electrode structure, the wiring, and the like in a single pixel of a liquid crystal display device.

What the liquid crystal display device according to this sixth embodiment has in common with the other liquid crystal display device according to the first embodiment is that a plurality of storage capacity portions are provided between the pixel electrode structure and the previous gate line, but it differs in that these storage capacity portions are arranged in parallel. It differs also in that the pixel electrode structure and the opposing electrode structure are provided with the following configuration in order to dispose the storage capacity portions in parallel.

That is, as shown in FIG. 10, a pixel electrode structure (pixel electrode) 61 according to the present embodiment includes a plurality of pixel electrode portions 61a, an electrode linking portion 61b connected to the end of the pixel electrode portions 61a at the gate line $X_m$ side, and storage capacity electrodes 61c to 61e connected to the pixel electrode portions 61a at their ends on the gate line $X_{m-1}$ side such that a right angle is formed. The pixel electrode portions 61a are disposed parallel to one another and also disposed parallel to the data bus lines Y. The electrode linking portion 61b is provided near the gate line $X_m$ and is parallel therewith. Furthermore, the storage capacity portions 61c to 61e are provided on an opposing electrode wire 63b via the insulating layer 5, and form storage capacity portions 62a to 62c with a portion of the opposing electrode wire 63b. The storage capacity electrodes 61c to 61e, in light of the efficiency of their placement, each can be given a different area, and thus the capacities of the storage capacity portions 62a to 62c can be different from one another.

An opposing electrode structure (opposing electrode) 63 has a plurality of opposing electrode portions 63a linked at right angles with the opposing electrode wire 63b. The opposing electrode portions 63a are disposed parallel to one another, and also disposed parallel with respect to the pixel electrode portions 61a. Moreover, as is clear from FIG. 10, the pixel electrode portions 61a and the opposing electrode portions 63a are disposed in alternation. The opposing electrode wire 63b is disposed close to the previous gate line $X_{m-1}$ and is parallel therewith.

In a liquid crystal display device with this configuration, when there are defective locations $F_1$ to $F_3$ resulting in short-circuits, laser repair can be conducted at a repair location $F_1'$ with respect to the defective location $F_1$, at a repair location $F_2'$ with respect to the defective location $F_2$, and at a repair location $F_3'$ with respect to the defective location $F_3$.

In the present embodiment, because the storage capacity portions 62a to 62c are arranged in parallel, if laser repair is performed at any of the repair locations $F_1'$ to $F_3'$ mentioned above, all of the storage capacity portions 62a to 62c will not be lost as long as short-circuits do not simultaneously occur in all of the defective locations $F_1$ to $F_3$. For this reason, loss of the storage capacity portions can be minimized, and yield can be increased even further.

Figure 11:
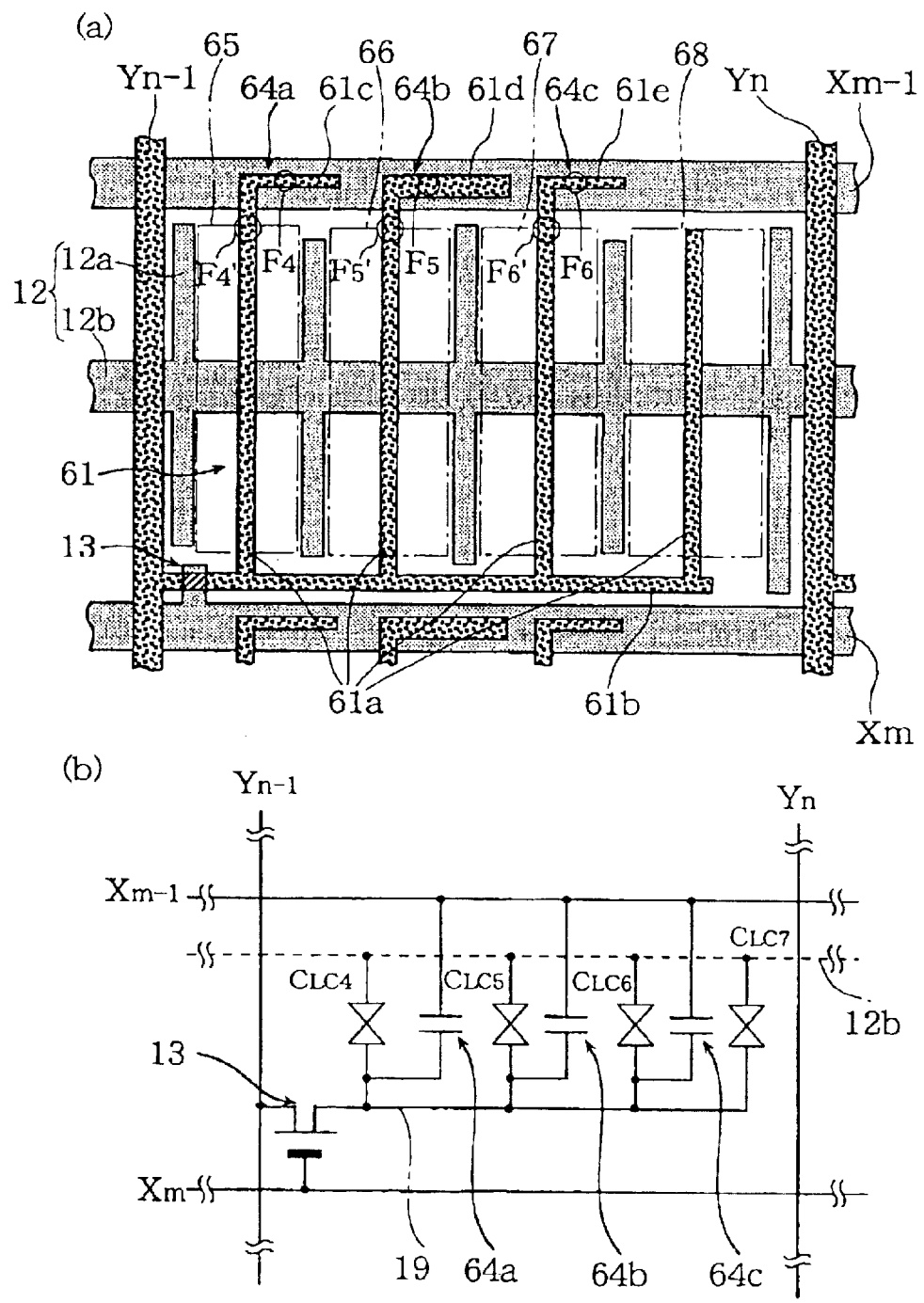
FIG. 11(a) is a plan view showing the arrangement of the pixel electrode structure, the opposing electrode structure, the wiring, and the like in a single pixel of another liquid crystal display device according to that sixth embodiment.
FIG. 11(b) is an equivalent circuit diagram showing the circuit configuration for an equivalent circuit of a single pixel in another liquid crystal display device.

In this embodiment of the present invention, it is possible to use an electrode having the planar shape shown in FIG. 11 (the opposing electrode structure used in the above-described first embodiment, for example) for the opposing electrode structure. FIG. 11(a) is a plan view showing the arrangement of the pixel electrode structure, the opposing electrode structure, the wiring, and the like in a single pixel of another liquid crystal display device according to the present embodiment. In this case, the storage capacity electrodes 61c to 61e in the pixel electrode structure 61 are provided on the previous gate line $X_{m-1}$ via the insulating layer 5, and form storage capacity portions 64a to 64c with a portion of the gate line $X_{m-1}$.

When the opposing electrode structure 12 and the pixel electrode structure 61 of the resulting configuration are combined, defective locations $F_4$ to $F_6$ are the sites where it is conceivable that short-circuits could occur. The laser repair can be performed on these defective locations at a repair location $F_4'$ with respect to the defective location $F_4$, at a repair location $F_5'$ with respect to the defective location $F_5$, and at a repair location $F_6'$ with respect to the defective location $F_6$.

Furthermore, because the storage capacity portions 62a to 62c are arranged in parallel, even when laser repair is performed at any of the repair locations $F_4'$ to $F_6'$ mentioned above, all of the storage capacity portions 64a to 64c will not be lost as long as short-circuits do not simultaneously occur at all of the defective locations $F_4$ to $F_6$, and thus, as mentioned earlier, it is possible to attain a further improvement in yield.

When the storage capacity portions are arranged in parallel, as in the present embodiment, the following circuit configuration is achieved. FIG. 11(b) is an equivalent circuit diagram showing the circuit configuration of the equivalent circuit in a single pixel of the above-described other liquid crystal display device. As can be understood from FIG. 11(b), the liquid crystal capacity $C^{LC}$ is actually expressed as the total sum of the liquid crystal capacity $C_{LC4}$, the liquid crystal capacity $C_{LC5}$, the liquid crystal capacity $C_{LC6}$, and the liquid crystal capacity $C_{LC7}$. The liquid crystal capacity $C_{LC4}$ is the liquid crystal capacity formed by a region 65 shown by the phantom line in FIG. 11(a), the liquid crystal capacity $C_{LC5}$ is the liquid crystal capacity formed by a region 66, the liquid crystal capacity $C_{LC6}$ is the liquid crystal capacity formed by a region 67, and the liquid crystal capacity $C_{LC7}$ is the liquid crystal capacity formed by a region 68.

Seventh Embodiment

Figure 12:
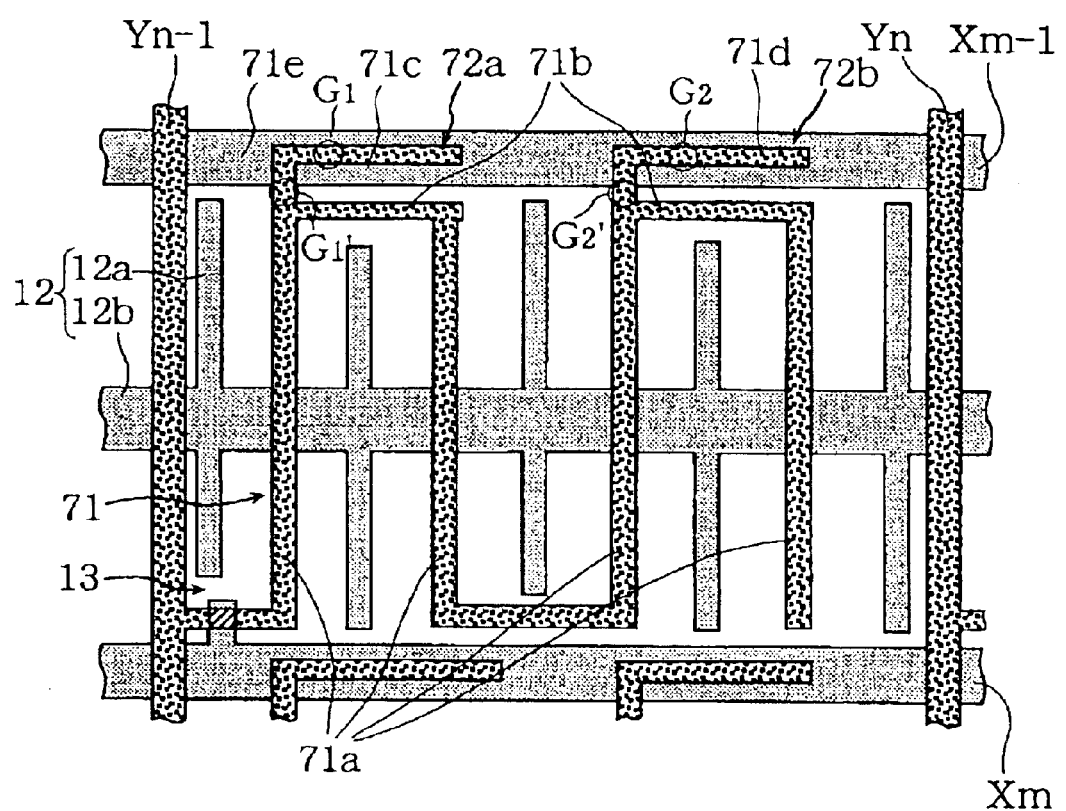
FIG. 12 is a plan view showing the arrangement of the pixel electrode structure, the opposing electrode structure, the wiring, and the like in the single pixel of a liquid crystal display device according to a seventh embodiment of the present invention.
Figure 13:
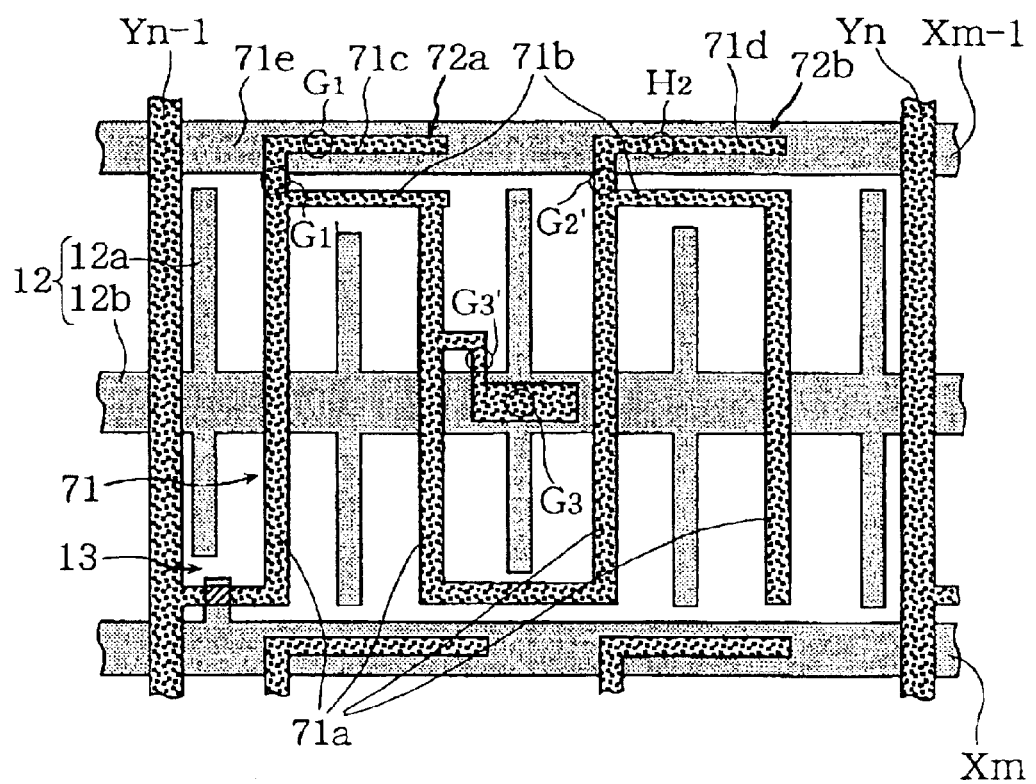
FIG. 13 is a plan view showing the arrangement of the pixel electrode structure, the opposing electrode structure, the wiring, and the like in a single pixel of another liquid crystal display device according to that seventh embodiment.

A seventh embodiment of the present invention is described below with reference to FIG. 12 and FIG. 13. FIG. 12 is a plan view showing the arrangement of a pixel electrode, an opposing electrode, a wiring, and the like in a single pixel of a liquid crystal display device according to the present embodiment. FIG. 13 is a plan view showing the arrangement of a pixel electrode, an opposing electrode, a wiring, and the like in a single pixel of another liquid crystal display device according to the present embodiment.

What the liquid crystal display device according to the present seventh embodiment has in common with the other liquid crystal display device according to the above-mentioned sixth embodiment is that a plurality of storage capacity portions are provided between the pixel electrode and the previous gate line, however, it differs therewith in that the following configuration is given to the pixel electrode.

That is, as shown in FIG. 12, a pixel electrode structure (pixel electrode) 71 according to the present embodiment includes a plurality of pixel electrode portions 11a and electrode linking portions 71b linked together in alternation, and storage capacity electrodes 71c and 71d each provided on the pixel electrode portions 11a via the connection electrode wire 71e. More specifically, of the pixel electrode portions 71a, the first and third pixel electrode portions 71a from the TFT 13 side each extend all the way to the previous gate line $X_{m-1}$. Moreover, the storage capacity electrode 71c is connected to the first pixel electrode portion 71a at a right angle, and the storage capacity electrode 71d is connected to the third pixel electrode portion 71a at a right angle. The storage capacity electrodes 71c and 71d are provided on the previous gate line $X_{m-i}$ via the insulating layer 6, and form storage capacity portions 72a and 72b with a portion of the gate line $X_{m-1}$. Furthermore, the storage capacity electrodes 71c and 71d have different areas, and this makes the capacities of the storage capacity portions 72a and 72b differ from one another. The pixel electrode portions 71a are arranged parallel to one another and are also parallel with respect to the data bus lines Y. Also, the electrode linking portions 71b are provided parallel to the gate bus lines X. The connection electrode wires 71e can also have the structure explained in the fourth embodiment mentioned above that includes separation portions and marking portions.

In a liquid crystal display device with this configuration, when there are defective locations $G_1$ or $G_2$ resulting in short-circuits between the gate line $X_{m-1}$ and the storage capacity electrode 71c or the storage capacity electrode 71d, laser repair is performed at a repair location $G_1'$ or a repair location $G_2'$, respectively.

In the present embodiment, because the storage capacity portions 72a to 72c are arranged in parallel, even if laser repair is performed at either of the aforementioned repair locations $G_1'$ or $G_2'$, both of the storage capacity portions 72a and 72b are not simultaneously lost as long as short-circuits occur do not occur at the same time in the defective locations $G_1$ and $G_2$, and thus the yield can be increased even more. Also, there are no pixel electrode portions 71a that become inoperable even if laser repair is performed at one of the repair locations $G_1'$ or $G_2'$, so the liquid crystal can be driven with the entire region of the repaired pixel. Thus, repaired pixels can be made even more inconspicuous, and a further improvement in yield can be achieved.

In the present embodiment, further storage capacity portions can be provided between the pixel electrode 71 and the opposing electrode wire 12b. More specifically, as shown in FIG. 13, a storage capacity portion 72c can be formed between a storage capacity electrode 71f and the opposing electrode wire 12b by providing the storage capacity electrode 71f, which is connected to the second pixel electrode portion 71a from the TFT 13 side via a connection electrode wire 71g, on the opposing electrode wire 12b. Providing this storage capacity portion 72c increases the number of storage capacity portions and spreads out their arrangement, so the achieved result is that the probability that the entire surface of the pixel will become defective can be even further reduced. When there is a defective location $G_3$ in the storage capacity portion 72c resulting in a short-circuit between the storage capacity electrode 71f and the opposing electrode wire 12b, then the laser repair should be performed on a repair location $G_3'$.

Eighth Embodiment

Figure 14:
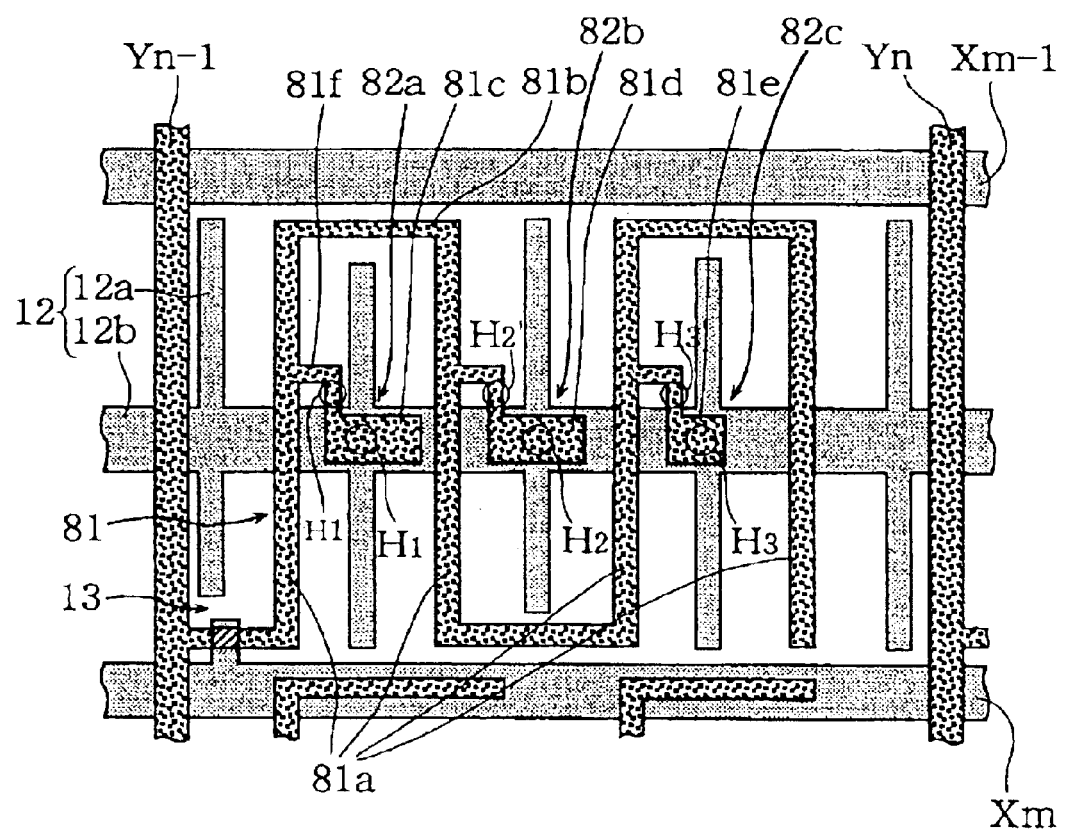
FIG. 14 is a plan view showing the arrangement of the pixel electrode structure, the opposing electrode structure, the wiring, and the like in a single pixel of a liquid crystal display device according to an eighth embodiment of the present invention.

An eighth embodiment of the present invention is described below with reference to FIG. 14. FIG. 14 is a plan view showing the arrangement of the pixel electrode, the opposing electrode, the wiring, and the like in a single pixel of a liquid crystal display device.

The liquid crystal display device according to this eighth embodiment differs from the liquid crystal display device according to the above-mentioned second embodiment in that the storage capacity portions are arranged in parallel.

As shown in FIG. 14, in the liquid crystal display device according to the present embodiment, a pixel electrode structure (pixel electrode) 81 is an electrode structure in the shape of a long unbroken line wherein a plurality of pixel electrode portions 81a are linked in alternation with electrode linking portions 81b. Furthermore, storage capacity electrodes 81c to 81e are connected to the pixel electrode portions 81a in order from the TFT 13 side via connection electrode wires 81f. The storage capacity electrodes 81c to 81e are provided on an opposing electrode wire 12b via an insulating layer 5, and form storage capacity portions 82a to 82c with a portion of the opposing electrode wire 12b. The pixel electrode portions 81a are arranged parallel to one another, and are also arranged parallel to the data bus lines Y Also, the electrode linking portions 81*b* are disposed such that they run parallel to the gate bus lines X. The connection electrode wires 81*f* each include separation portions (not shown in the drawings) for making separation easy when irradiating laser light, and marking portions (not shown in the drawings) for making it easy to confirm these separation portions. The storage capacity electrodes 81*c* to 81*e* have different areas, and thus the capacities of the storage capacity portions 82*a* to 82*c* differ from one another.

In an array substrate with this configuration, when there are defective locations $H_1$ to $H_3$ resulting in short-circuits between the opposing electrode wire 12*b* and any of the storage capacity electrodes 81*c* to 81*e*, laser repair is performed at repair locations $H_1'$ to $H_3'$, respectively.

The storage capacity portions 82*a* to 82*c* are arranged in parallel, so even if laser repair is performed at any of the aforementioned repair locations $H_1'$ to $H_3'$, all of the storage capacity portions 82*a* to 82*c* are not simultaneously lost as long as short circuits do not occur in the defective locations $H_1$ to $H_3$ simultaneously, and thus yield can be improved still more. Additionally, there are no pixel electrode portions 81*a* that are made inoperable even if laser repair is performed at any of the repair locations $H_1'$ to $H_3'$, so all regions of the repaired pixel can be operated.

Ninth Embodiment

Figure 15:
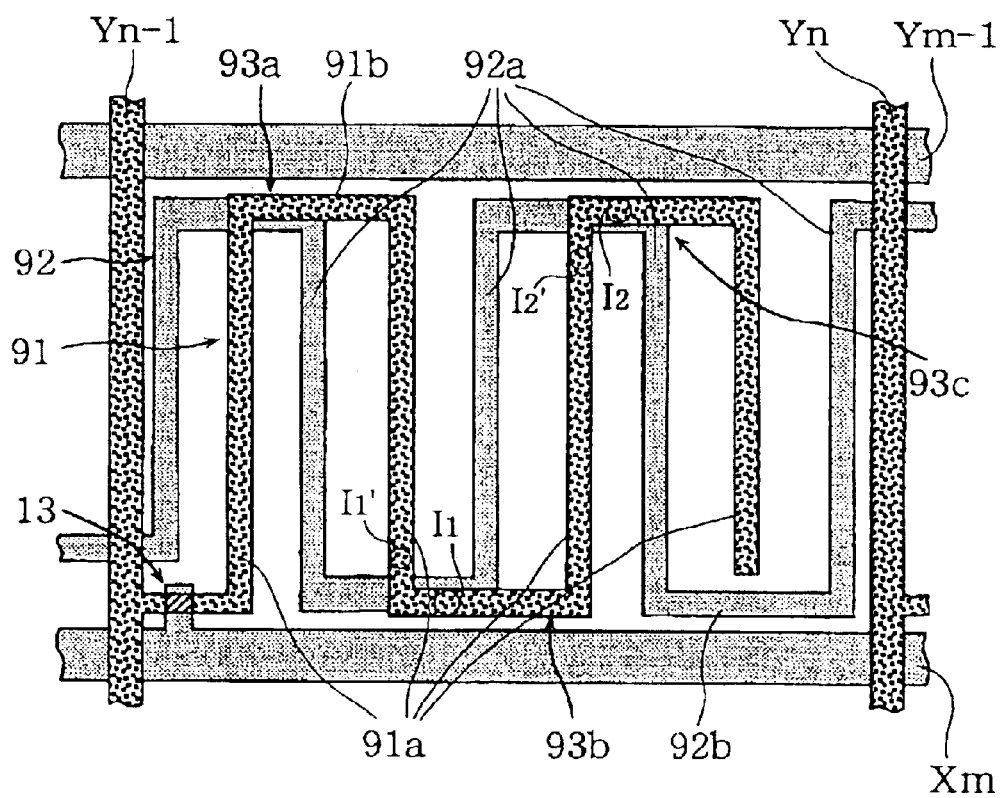
FIG. 15 is a plan view showing the arrangement of the pixel electrode structure, the opposing electrode structure, the wiring, and the like in a single pixel of the liquid crystal display device according to a ninth embodiment of the present invention.

A ninth embodiment of the present invention is described below with reference to FIG. 15. FIG. 15 is a plan view showing the arrangement of the pixel electrode, the opposing electrode, the wiring, and the like in a single pixel of a liquid crystal display device.

The liquid crystal display device according to this ninth embodiment is characterized in that a plurality of storage capacity portions is arranged in series between the pixel electrode and the opposing electrode. A specific description follows below.

As shown in FIG. 15, a pixel electrode structure (pixel electrode) 91 is an electrode in the shape of a long unbroken line wherein a plurality of pixel electrode portions 91*a* are linked in alternation with electrode linking portions 91*b*. Additionally, an opposing electrode structure (opposing electrode) 92 is an electrode in the shape of a long unbroken line wherein a plurality of opposing electrode portions 92*a* are linked in alternation with electrode linking portions 92*b*.

The pixel electrode portions 91*a* and the opposing electrode portions 92*a* are disposed parallel to one another, and are also disposed parallel with respect to the data bus lines Y. The electrode linking portions 91*b* in the pixel electrode structure 91 and the electrode linking portions 92*b* in the opposing electrode structure 92 are provided parallel to the gate bus lines X.

Furthermore, portions of the electrode linking portions 91*b* in the pixel electrode 91 and portions of the electrode linking portions 92*b* in the opposing electrode 92 overlap via the insulating layer 5, thus forming storage capacity portions 93*a* to 93*c* arranged in series in that order from the TFT 13 side.

In an array substrate with this configuration, when there are defective locations $I_1$ and $I_2$ resulting in a short-circuit between the pixel electrode portions 91*a* of the pixel electrode 91 and the opposing electrode portions 92*a* of the opposing electrode 92, laser repair is performed at a repair location $I_1'$ or a repair location $I_2'$, respectively. Thus, an improvement in yield can be achieved. In addition, by using the pixel electrode 91 and the opposing electrode 92 with the aforementioned configuration, the opposing electrode wire 12*b* disposed in the center of the pixel can be removed, and the numerical aperture of the pixel can be increased. The result is that the display screen can by made even brighter.

Further Considerations

The above-described first to ninth embodiments provided examples of configurations with a plurality of storage capacity portions arranged in series, in rows, or in a loop shape, however, the present invention is by no means limited to these examples. For example, it is possible to combine any two of the three aforementioned arrangements into a suitable configuration if necessary, or all three arrangements can be combined in one configuration.

Moreover, in the above-described first to ninth embodiments, it is possible to further provide compensation capacity portions to further eliminate discrepancies in brightness and in flicker properties between repaired pixels and normal pixels. For example, providing compensation capacity portions in a liquid crystal display device according to the first embodiment would result in the following configuration.

Figure 16:
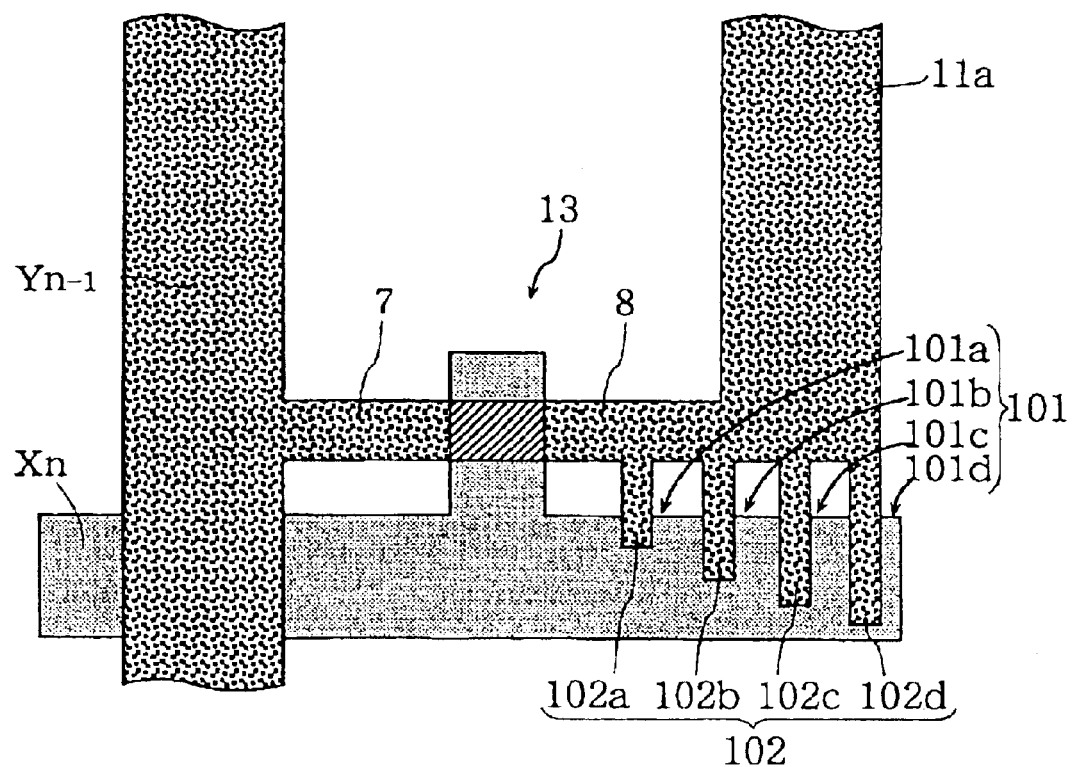
FIG. 16 is a plan view showing the essential components in a single pixel when compensation capacity portions are provided in a liquid crystal display device according to the above-mentioned first embodiment.
Figure 17:
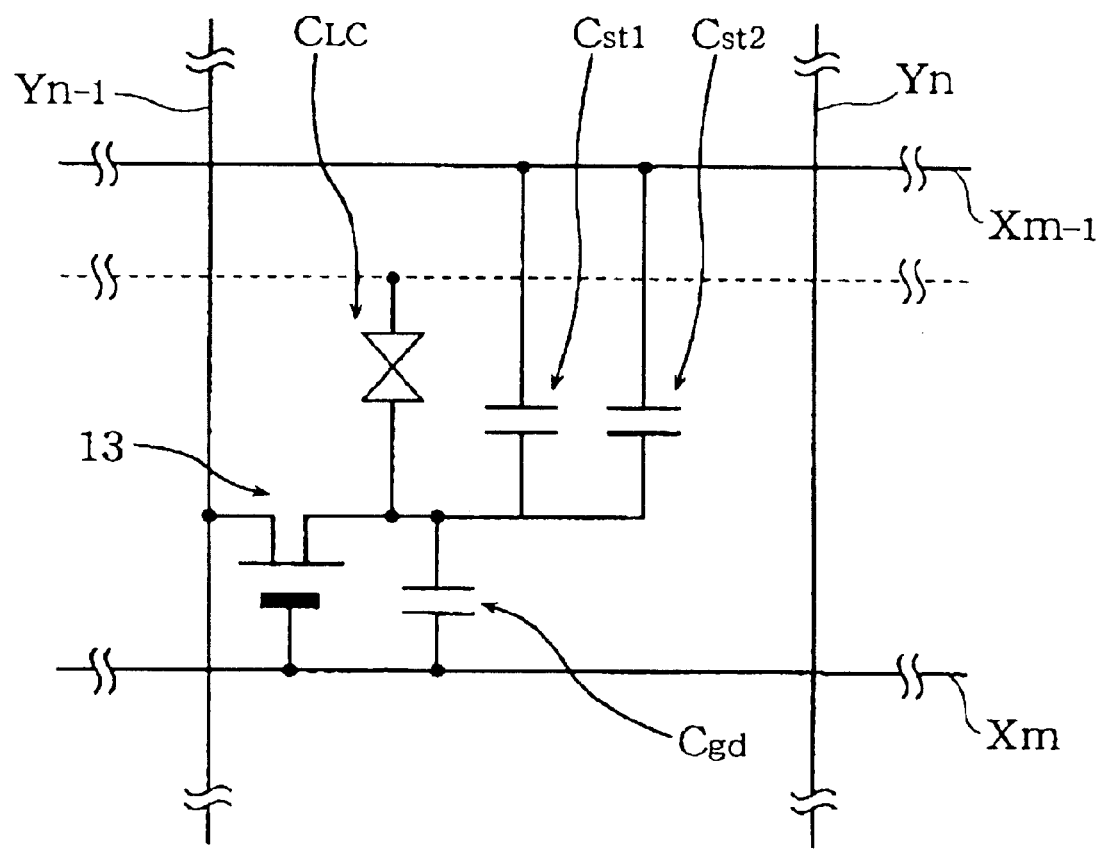
FIG. 17 is an equivalent circuit diagram of a pixel provided with those compensation capacity portions.
Figure 18:
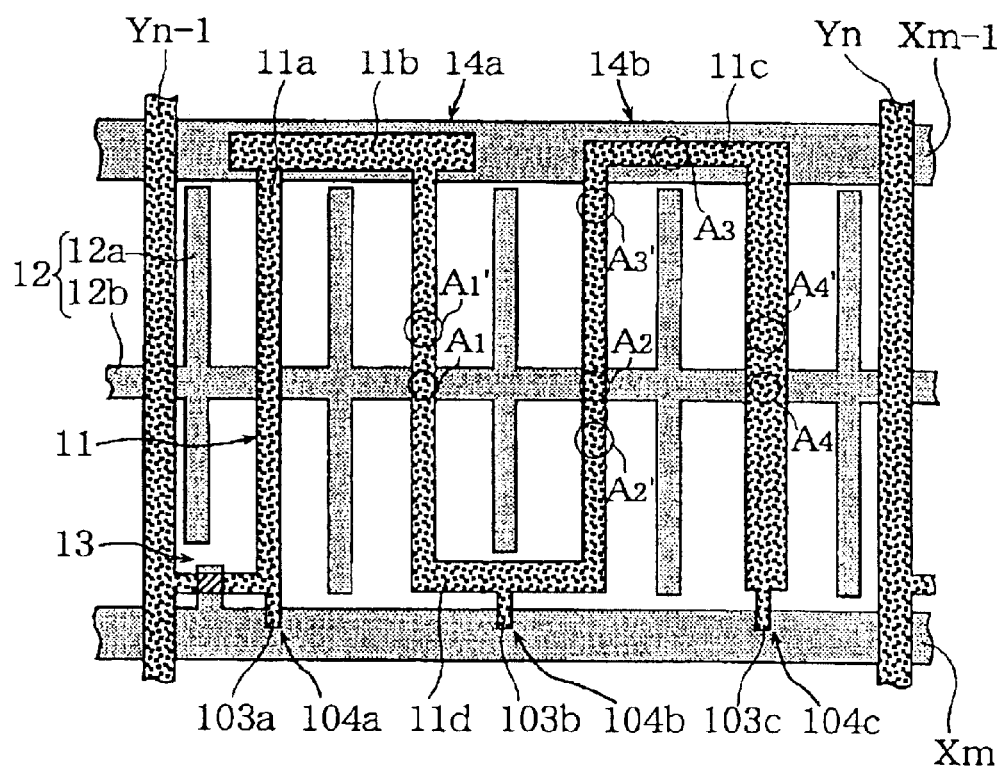
FIG. 18 is a plan view showing the essential components in a single pixel when other compensation capacity portions are provided in a liquid crystal display device according to the above-mentioned first embodiment.

FIG. 16 is a plan view showing the essential components in a single pixel when compensation capacity portions are provided in a liquid crystal display device according to the first embodiment. FIG. 17 is an equivalent circuit diagram of a configuration in which compensation capacity portions are provided. FIG. 18 is a plan view showing the essential components in a single pixel when other compensation capacity portions are provided in a liquid crystal display device according to the first embodiment.

As shown in FIG. 16, a compensation portion 101 is formed by overlapping a compensation capacity electrode 102 with a portion of the gate line $X_m$ via the insulating layer 5. Compensation capacity electrodes 102*a* to 102*d* are connected to a drain electrode 8. Furthermore, the compensation capacity electrodes 102*a* to 102*d* differ from one another in their area of overlap with the gate line $X_m$, which decreases the closer the compensation capacity electrode is to the TFT 13. Thus, the closer the compensation capacity portions 101*a* to 101*d* are to the TFT 13, the smaller the capacity of their compensation capacitance becomes. The capacities of the compensation capacitances of the compensation capacity portions 101*a* to 101*d* are different so that the capacity of the compensation capacitances can be adjusted easily in accordance with the location of the areas repaired by laser repair.

For example, in FIG. 1, when laser repair is performed on the repair location $A_3'$, the ratio of the liquid crystal capacity to the storage capacity changes when compared to that ratio prior to laser repair. For this reason, in the first embodiment, that change is anticipated and the capacity of the storage capacity portion 14*a* and the capacity of the storage capacity portion 14*b* are made different from one another. On the other hand, the amount of pixel voltage fluctuation caused by the coupling of scanning signals from the gate line associated with that pixel corresponds to the ratio of the capacities. Thus, the ratio of the liquid crystal capacity to the storage capacity is kept from significantly changing.

On the other hand, the compensation capacity portion 101 minutely adjusts the ratio of the total liquid crystal capacity and the storage capacity to the compensation capacity, and brings that ratio even closer to that of a normal pixel. More specifically, the ratio of the total liquid crystal capacity and the storage capacity to the compensation capacity is adjusted to an optimal ratio by cutting away one or more of the compensation capacity electrodes 102*a* to 102*d* from the drain electrode 8 by laser trimming to alter the total capacity of the compensation capacity portion 101.

The above case was described as an example of the compensation capacity portion 101 being formed by the compensation capacity electrode 102, which is connected to the drain electrode 8, and the gate line $X_m$ overlapping via the insulating layer 5, however, the present invention is by no means limited to this configuration. For example as shown in FIG. 18, a liquid crystal display device according to the present invention can include a compensation capacity portion 104a formed by a compensation capacity electrode 103a, which is connected to the drain electrode 8, overlapping with the gate line $X_m$; a compensation capacity portion 104b formed by a compensation capacity electrode 103b, which is connected to the electrode linking portion 11d, overlapping with the gate line $X_m$; and a compensation capacity portion 104c formed by a compensation capacity electrode 103c, which is connected to the pixel electrode portions 11a, overlapping with the gate line $X_m$. In this case, when laser repair is performed on the repair location $A_3'$, for example, while an electrode linking portion 11c that short-circuited with the gate line $X_{m-1}$ is separated from the pixel electrode structure 11, the compensation capacity electrode 103c can also be cut off. The result is that by performing laser repair a single time, the repair of a bad pixel is achieved, changes in the ratio of the total liquid crystal capacity and the storage capacity to the compensation capacity can also be automatically adjusted, and a more effective and shorter process for performing adjustments can be achieved.

Further, in the above-mentioned first to ninth embodiments, it is preferable that before laser repair, it is detected whether contaminants such as dust particles adhere to the array substrate, and if such contaminants adhere to the array substrate, to perform repair with the purpose of removing those contaminants. More specifically, a microscope is used to scan for defects on the array substrate. Contaminants that can be detected during this inspection are dust particles of about 20 $\mu$m, for example. When the result of this inspection is that dust particles, for example, adhere to a gate line, a data line, or the like, then this is repaired by irradiating laser light to gouge out a portion of the gate line or data line together with that dust particle. At this time it is necessary that the repair is performed in such as way that the gate line or data line is not severed. Performing this repair prevents laser repair from being conducted when there are no short-circuit defects that require a portion of the pixel electrode to be cut off, and a further increase in yield is achieved.

Figure 19:
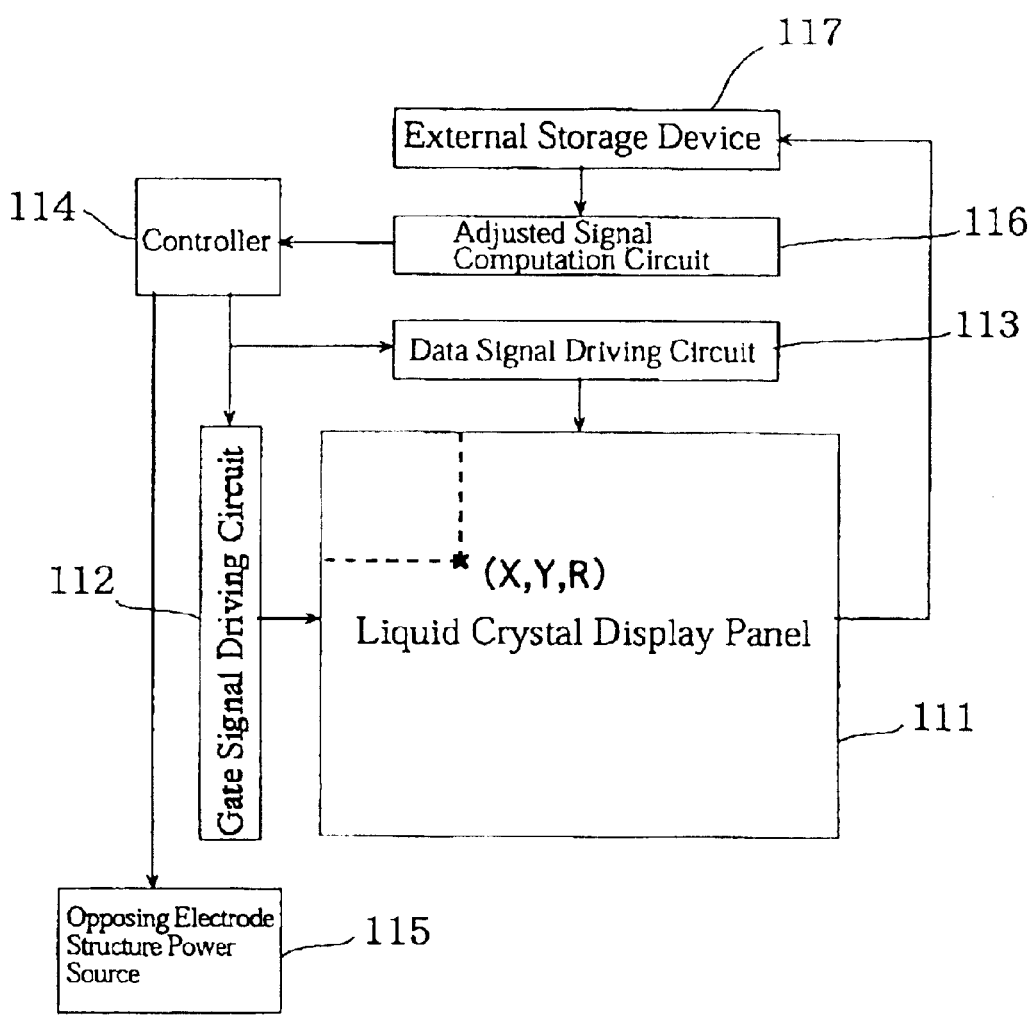
FIG. 19 is a block diagram illustrating the drive method of a liquid crystal display device according the present invention.
Figure 20:
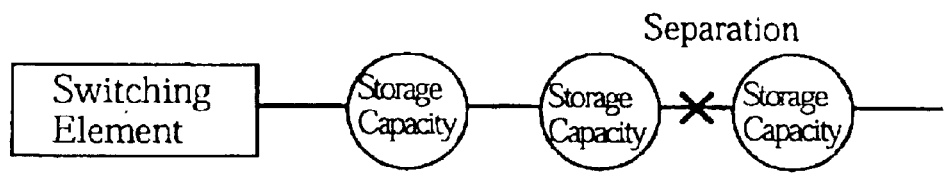
FIG. 20 is a conceptual diagram which schematically illustrates the arrangements of a plurality of storage capacities according to the present invention.
Figure 20:
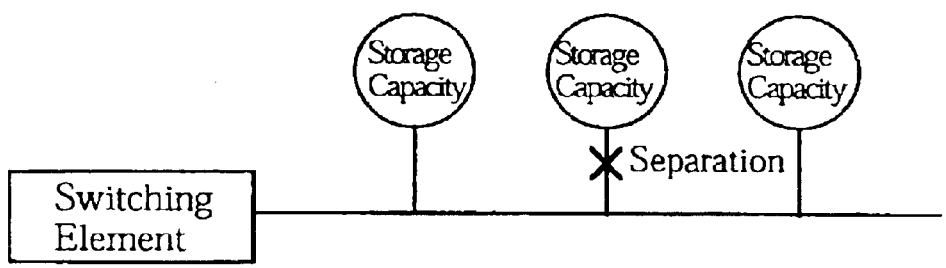
Figure 20:
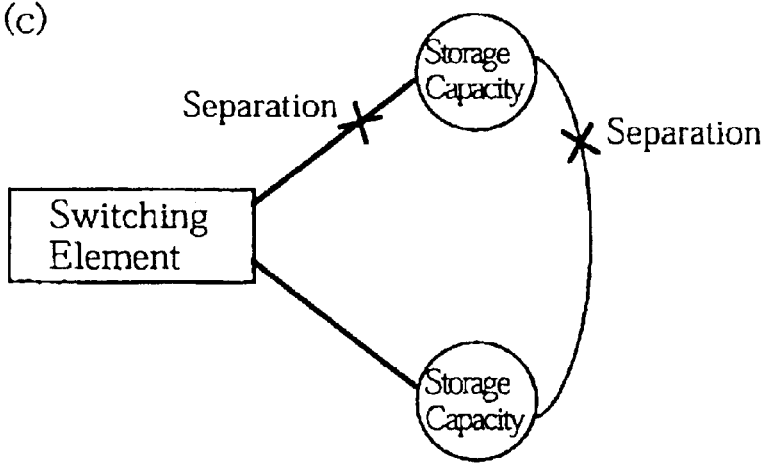
Figure 21:
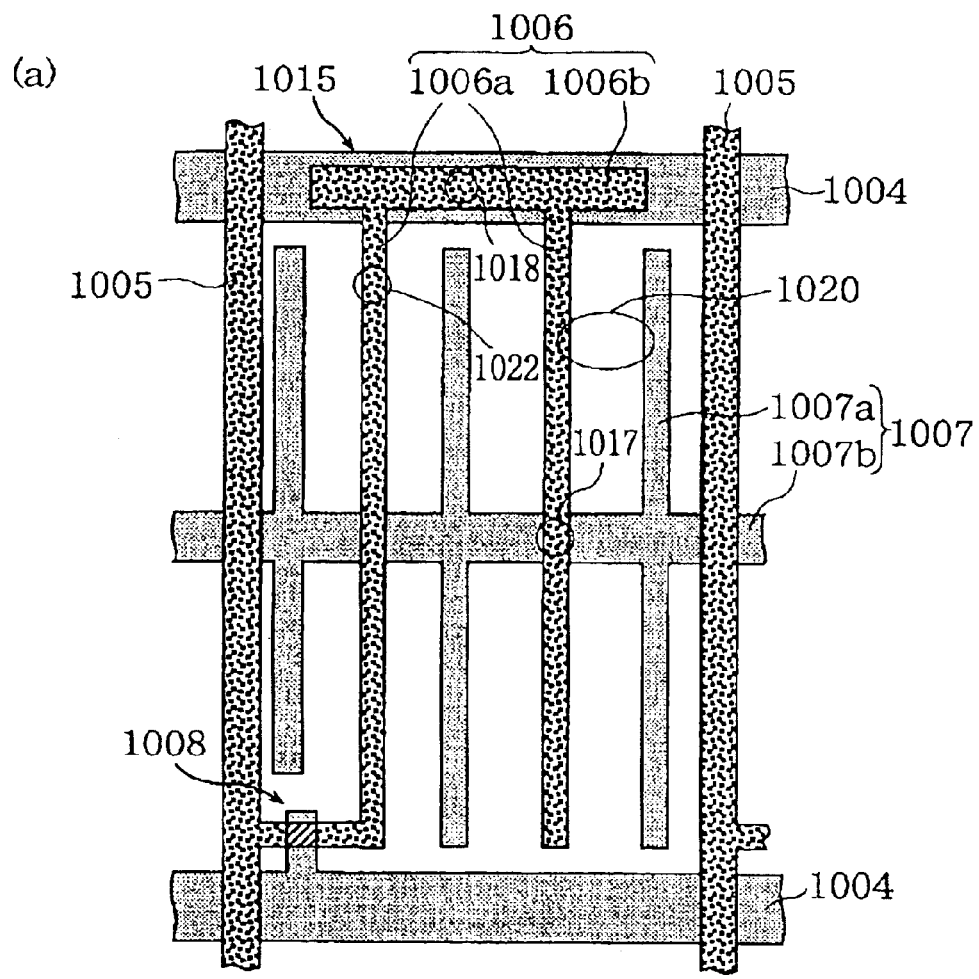
FIG. 21(a) is a plan view illustrating the arrangement of the electrodes, the wiring, and the like in a single pixel in a liquid crystal display panel provided in a conventional active-matrix liquid crystal display device of the transverse electric field type.
FIG. 21(b) is a cross-sectional view of that liquid crystal display device.
Figure 21:
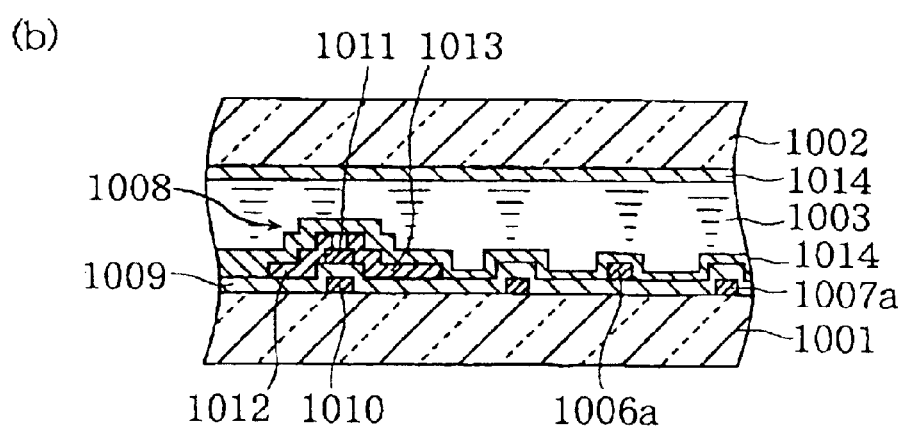
Figure 22:
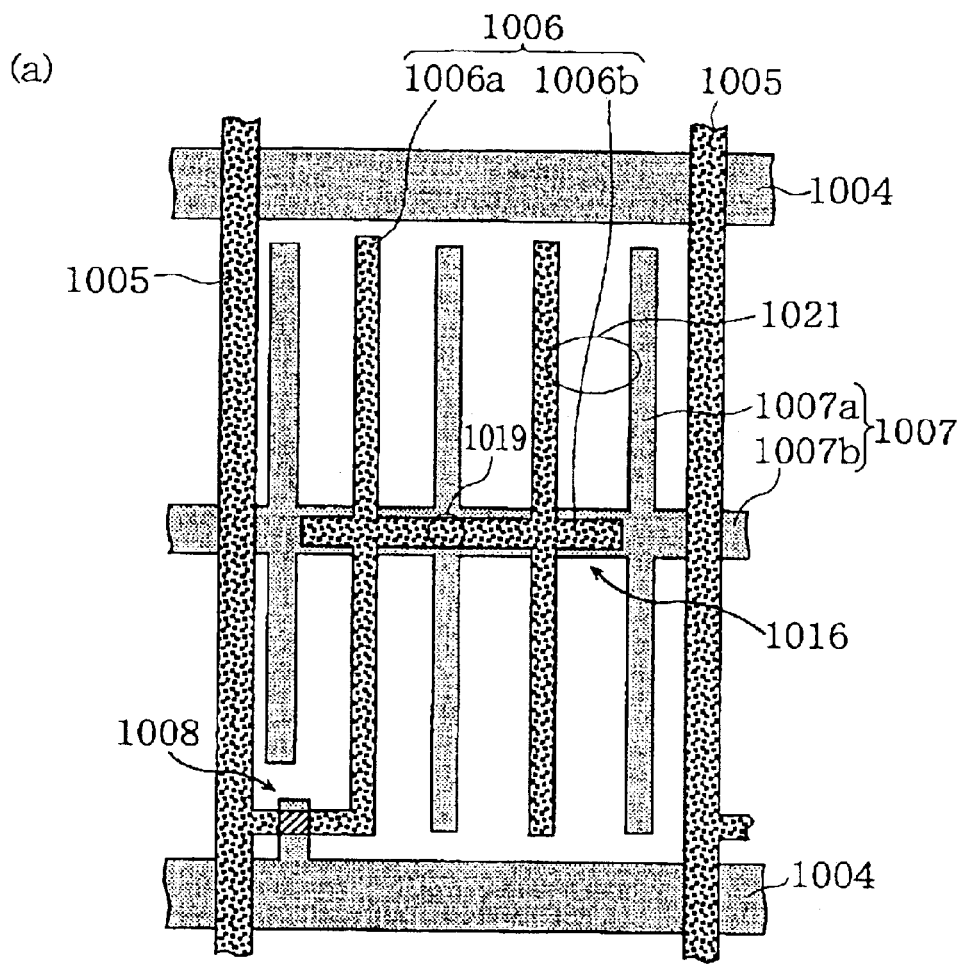
FIG. 22(a) is a plan view showing the arrangement of the electrodes, the wiring, and the like in a single pixel in a liquid crystal display panel provided in another conventional active-matrix liquid crystal display device of the transverse electric field type.
FIG. 22(b) is a cross-sectional view of that liquid crystal display device.
Figure 22:
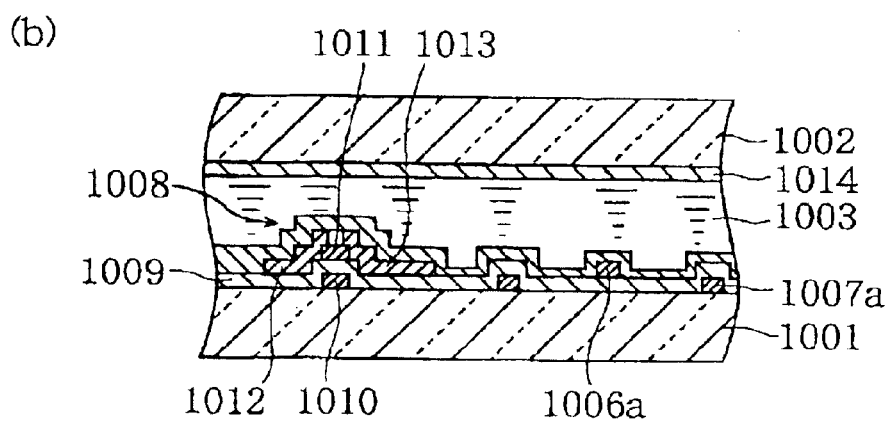

Furthermore, in the above-mentioned first through ninth embodiments, the liquid crystal display device can be driven by the drive method described below based on information relating to the repaired pixel. FIG. 19 is a block diagram for explaining the drive method of a liquid crystal display device according to the present invention As shown in FIG. 19, a liquid crystal display panel 111 is provided with a gate signal drive circuit 112 for applying gate signals to the gate bus lines X and a data signal drive circuit 113 for applying data signals to the data bus lines Y. The gate signal drive circuit 112 and the data signal drive circuit 113 are connected to a controller 114 that creates control signals for driving the liquid crystal display panel 111. Additionally, an opposing electrode structure power source 115 for supplying a voltage to the opposing electrodes is also connected to the controller 114. Furthermore, the controller 114 is also connected to an adjusted signal computation circuit 116. The adjusted signal computation circuit 116 is connected to an external storage device 117 for storing information pertaining to the repaired pixels.

In a drive circuit with this structure, the liquid crystal display panel 111 is driven by the following method. First, information relating to bad pixels in the liquid crystal display panel 111 that have been laser repaired (that is, repaired pixels) is stored in the external storage device 117. Specifically, information pertaining to repaired pixels is the information on the pixel location and the repaired locations in repaired pixels ((X, Y, R) (X, Y: pixel location, R: repaired location in a repaired pixel)). This information is input to the adjusted signal computation circuit 116. The adjusted signal computation circuit 116 computes the adjusted voltage that should optimally drive the repaired pixel based on this inputted information pertaining to the repaired pixel. At the time of computation, because the storage capacity of repaired pixel is obtained by calculations based on the information of the repaired locations in a repaired pixel, the drop in brightness corresponding to this capacity is considered. Based on the results of this computation, the controller 114 produces a regular control signal for normal pixels, and on the other hand, produces a compensated control signal for repaired pixels. Furthermore, based on these control signals, the gate signal drive circuit 112 and the data signal drive circuit 113 apply a gate signal and a compensated data signal to the repaired pixels, and achieve optimal driving of the liquid crystal display panel 111. Here, compensated data signals refer to data signals of a higher voltage than the data signals applied to normal pixels.

INDUSTRIAL APPLICABILITY

The present invention is embodied by the configurations described above, and has the following effects.

With a liquid crystal display device according to the present invention, bad pixels can be displayed, because only storage capacities with a short-circuit are cut off, and moreover, because the remaining normal storage capacities inhibit fluctuations in the electric potential level of the pixel electrode even after storage capacities with defects have been separated, no extreme variations are caused in the brightness and in the flicker properties, for example, compared to normal pixels. Therefore, bad pixels can be made even more inconspicuous on the display screen, and an improvement in yield can be achieved.

Additionally, with the method of repairing pixels in a liquid crystal display device according to the present invention, even if an electrical short-circuit occurs between the pixel electrode and a portion of the previous or subsequent gate line and/or the opposing electrode, other regions not related to the short-circuit remain capable of display, because only the overlapping portion where the short-circuit occurs is cut off. Therefore, with the above-described method, bad pixels in which short-circuits has occured can be prevented from becoming pixels that do not illuminate. Moreover, even if short-circuits occur in the overlap portions that form the storage capacities, other storage capacities offset this and operate, and thus repaired pixels do not exhibit an extreme drop in brightness over normal pixels. This brings a liquid crystal display device with bad pixels closer to a state wherein normal display is possible, and an increase in yield can be achieved.

Furthermore, with the drive method for a liquid crystal display device according to the present invention, regular gate signals and data signals are applied to normal pixels to drive those pixels, while gate signals and data signals in accordance with repaired pixels are applied to repaired pixels based on that pixel's location and the repaired locations within the repaired pixel, and repaired pixels are driven. This enables repaired pixels to be driven with a brightness that is close to the brightness of normal pixels, and repaired pixels can be made even more inconspicuous in a display screen.

Therefore, the present invention has considerable industrial significance.

What is claimed is:

1. A liquid crystal display device, wherein a liquid crystal layer is formed between a pair of substrates, and wherein liquid crystal in the liquid crystal layer is driven by an electric field that is parallel to the substrate surface, wherein provided on one substrate of the pair of substrates are:

a plurality of gate lines;

a plurality of data lines provided such that the data lines intersect with the plurality of gate lines;

switching elements associated with points where the plurality of gate lines and the plurality of data lines intersect, and which are connected to the gates lines and the data lines;

pixel electrodes connected to the data lines via the switching elements; and opposing electrodes forming pairs with the pixel electrodes;

wherein in each pixel, a plurality of storage capacities for maintaining a charge of the pixel electrode are provided in a distributed arrangement associated with points where the plurality of gate lines and the plurality of data lines intersect, and each of said storage capacities can be isolated without disabling remaining said storage capacities.

2. The liquid crystal display device according to claim 1, wherein at least some of the plurality of storage capacities are arranged in series.

3. The liquid crystal display device according to claim 2, wherein a bypass is provided for bypassing the storage capacity from among the plurality of storage capacities arranged in series that is closest to the switching element.

4. The liquid crystal display device according to claim 1, wherein at least some of the plurality of storage capacities are arranged in parallel.

5. The liquid crystal display device according to claim 1, wherein at least some of the plurality of storage capacities are arranged in a loop.

6. An array substrate, comprising:

a plurality of gate lines;

a plurality of data lines provided such that the data lines intersect with the plurality of gate lines;

switching elements associated with points where the plurality of gate lines and the plurality of data lines intersect, and which are connected to the gates lines and the data lines;

pixel electrodes connected to the data lines via the switching elements; and opposing electrodes forming pairs with the pixel electrodes;

wherein in each pixel, a plurality of storage capacities for maintaining a charge of the pixel electrodes are provided in a distributed arrangement associated with points where the plurality of gate lines and the plurality of data lines intersect, and each of said storage capacities can be isolated without disabling remaining said storage capacities.

7. The liquid crystal display device according to claim 1, wherein each said storage capacity portions is such that a ratio between remaining storage capacity portions would not significantly change after one of said storage capacity portions is isolated from said remaining storage capacity portions.

* * * * *

UNITED STATES PATENT AND TRADEMARK OFFICE
CERTIFICATE OF CORRECTION

PATENT NO. : 6,781,659 B2
DATED : August 24, 2004
INVENTOR(S) : Akinori Shiota et al.

It is certified that error appears in the above-identified patent and that said Letters Patent is hereby corrected as shown below:

<u>Column 32,</u>
After line 35, add Claim 8 as follows:
-- 8. The liquid crystal display device according to claim 6, wherein each said storage capacity portions is such that a ratio between remaining storage capacity portions would not significantly change after one of said storage capacity portions is isolated from said remaining storage capacity portions. --

Signed and Sealed this

First Day of February, 2005

JON W. DUDAS
*Director of the United States Patent and Trademark Office*